United States Patent
Fripp et al.

(10) Patent No.: US 11,065,807 B2
(45) Date of Patent: Jul. 20, 2021

(54) METHOD OF MANUFACTURING A HEAT-SHRINK ELASTOMERIC ELEMENT

(71) Applicants: Halliburton Energy Services, Inc., Houston, TX (US); Board of Regents, The University of Texas System, Austin, TX (US)

(72) Inventors: Michael L. Fripp, Carrollton, TX (US); Kejia Yang, Dallas, TX (US); Radu Reit, Plano, TX (US); Benjamin Lund, Wylie, TX (US); Walter Voit, Dallas, TX (US)

(73) Assignees: The University of Texas System Board of Regents, Austin, TX (US); Halliburton Energy Services, Inc., Houston, TX (US)

( * ) Notice: Subject to any disclaimer, the term of this patent is extended or adjusted under 35 U.S.C. 154(b) by 469 days.

(21) Appl. No.: 15/768,458

(22) PCT Filed: Apr. 13, 2017

(86) PCT No.: PCT/US2017/027406
§ 371 (c)(1),
(2) Date: Apr. 13, 2018

(87) PCT Pub. No.: WO2018/190845
PCT Pub. Date: Oct. 18, 2018

(65) Prior Publication Data
US 2019/0077070 A1    Mar. 14, 2019

(51) Int. Cl.
*B29C 71/00* (2006.01)
*B29C 61/08* (2006.01)
(Continued)

(52) U.S. Cl.
CPC .............. *B29C 61/08* (2013.01); *B29C 71/02* (2013.01); *E21B 33/12* (2013.01); *E21B 33/127* (2013.01);
(Continued)

(58) Field of Classification Search
CPC ... B29C 35/02; B29C 35/08; B29C 2035/085; B29C 2035/0877; B29C 55/24;
(Continued)

(56) References Cited

U.S. PATENT DOCUMENTS 3,877,522 A    4/1975  Knight et al.
2002/0065373 A1  5/2002  Krishnan
(Continued)

FOREIGN PATENT DOCUMENTS

WO    2001031162 A1    5/2001
WO    2015163889 A1    10/2015

OTHER PUBLICATIONS

Walter Voit, "Optimization of mechanical properties and manufacturing techniques to enable shape-memory polymer processing", Dec. 2009, Georgia Tech.
(Continued)

*Primary Examiner* — Leo B Tentoni
(74) *Attorney, Agent, or Firm* — McGuireWoods, LLP

(57) ABSTRACT

Provided are methods and systems for manufacturing and using heat-shrink elastomeric. An example method of manufacturing a heat-shrink elastomeric element comprises providing a thermoplastic elastomeric element having a first shape; modifying the thermoplastic elastomeric element to produce a thermoset elastomeric element having the first shape; heating the thermoset elastomeric element to a temperature of at least the glass transition temperature of the thermoset elastomeric element; adjusting the first shape of the thermoset elastomeric element to produce a second
(Continued)

shape with at least one dimension greater than that of the first shape; and cooling the thermoset elastomeric element to a temperature below that of the glass transition temperature of the thermoset elastomeric element to produce the heat-shrink elastomeric element.

9 Claims, 4 Drawing Sheets

(51) Int. Cl.

| | |
|---|---|
| *E21B 33/12* | (2006.01) |
| *B29C 71/02* | (2006.01) |
| *E21B 33/127* | (2006.01) |
| *B29C 55/24* | (2006.01) |
| *B29C 35/02* | (2006.01) |
| *B29C 35/08* | (2006.01) |
| *B29C 71/04* | (2006.01) |
| *C08J 3/24* | (2006.01) |
| *B29L 31/26* | (2006.01) |
| *B29K 21/00* | (2006.01) |
| *B29K 33/00* | (2006.01) |
| *B29K 75/00* | (2006.01) |

(52) U.S. Cl.
CPC .............. *B29C 35/02* (2013.01); *B29C 35/08* (2013.01); *B29C 55/24* (2013.01); *B29C 71/04* (2013.01); *B29C 2035/085* (2013.01); *B29C 2035/0877* (2013.01); *B29K 2021/003* (2013.01); *B29K 2033/08* (2013.01); *B29K 2033/26* (2013.01); *B29K 2075/00* (2013.01); *B29K 2995/0049* (2013.01); *B29L 2031/26* (2013.01); *B29L 2031/265* (2013.01); *C08J 3/24* (2013.01); *C08J 3/247* (2013.01)

(58) Field of Classification Search
CPC ......... B29C 61/08; B29C 71/02; B29C 71/04; B29K 2021/003; B29K 2033/08; B29K 2033/26; B29K 2075/00; B29K 2995/0049; B29L 2031/26; B29L 2031/265; C08J 3/24; C08J 3/247
USPC ..... 264/331.18, 331.19, 345, 347, 348, 479, 264/485, 488
See application file for complete search history.

(56) References Cited

U.S. PATENT DOCUMENTS

| | | |
|---|---|---|
| 2004/0002729 A1 | 1/2004 | Zamore |
| 2005/0084337 A1 | 4/2005 | Caldwell et al. |
| 2010/0140516 A1 | 6/2010 | Butuc |
| 2010/0155998 A1* | 6/2010 | Rule .................. C08L 65/00 264/331.17 |
| 2010/0288460 A1* | 11/2010 | Walker .................. B22C 9/10 164/44 |
| 2013/0256991 A1* | 10/2013 | Ramon ............... E21B 33/1208 277/316 |
| 2015/0337659 A1 | 11/2015 | Fechte-Heinen et al. |
| 2017/0073514 A1* | 3/2017 | Kurup ................ C08L 23/0869 |

OTHER PUBLICATIONS

International Search Report and Written Opinion date dated Nov. 29, 2017; International PCT Application No. PCT/US2017/027406.

* cited by examiner

METHOD OF MANUFACTURING A HEAT-SHRINK ELASTOMERIC ELEMENT

TECHNICAL FIELD

The present disclosure relates to elastomeric elements used with downhole tools, and more particularly, to methods of using and methods of manufacturing heat-shrink elastomeric elements comprising thermoset shape memory polymers to provide versatile elastomeric elements for use with downhole tools or surface equipment for oilfield applications.

BACKGROUND

Downhole tools and surface equipment such as tubing and cables are used throughout the lifetime of a well. In some instances these downhole tools and surface equipment may be fitted with elastomeric elements in order to provide a seal or clamp for a desired application.

One example of an elastomeric element fitted to a downhole tool is a packer (e.g., a swellable packer) fitted to the outer diameter of a section of tubing in order to provide an annular seal between the outer diameter of the packer and the inner diameter of an outer tubing, casing, etc. through which the tubing comprising the packer was inserted. Another example of an elastomeric element fitted to a downhole tool is a cable clamp used to clamp a cable to tubing when the tubing is run downhole. These cable clamps may attach to the tubing using elastomeric elements and may clamp the cable in place. One example of an elastomeric element fitted to surface equipment is an o-ring used to provide a seal in a pump. The o-ring may fit around a stem, cap, or other such element to provide a seal around the outer portion of the stem, cap, etc.

There are several issues with fitting elastomeric elements over the outer diameter of a downhole tool or surface equipment. For example, the size and shape of the chosen elastomeric element may be limited by the outer dimensions of the downhole tool or surface equipment. Because of this, the elastomeric elements may be produced to be standard shapes and sizes in order to fit standard profiles of downhole tools and surface equipment. This may limit the types of elastomeric elements generally available and reduce the versatility of the available elastomeric elements and their potential applications. Because of this, two pieces of tubing with different outer diameters may require two different sized elastomeric elements instead of one elastomeric element which could fit both pieces of tubing. Further, the areas on downhole tools in which the elastomeric elements may be fitted will also be limited as the elastomeric elements could only be placed on areas in which they could be fitted as determined by the dimensions of the downhole tool. This in turn may limit the areas in which elastomeric elements may be placed in the wellbore which may lead to restricting the areas of the wellbore in which certain applications could be performed.

Another issue that may occur when fitting elastomeric elements over a downhole tool or surface equipment is that variances in the profile and/or outer diameter of the downhole tool or surface equipment may impact the ability to place the elastomeric element. For example, it may be difficult to run an elastomeric packer to a specific point on a piece of tubing if the tubing has threads, an inflow control device, collar, shoe, etc. affixed to or a part of its exterior. Fitting an elastomeric element on the downhole tool or surface equipment may require removal of the component responsible for the profile variance. Performing said removal may increase downtime and result in additional operational expenditures.

BRIEF DESCRIPTION OF THE DRAWINGS

Illustrative examples of the present disclosure are described in detail below with reference to the attached drawing figures, which are incorporated by reference herein, and wherein.

Figure 1:
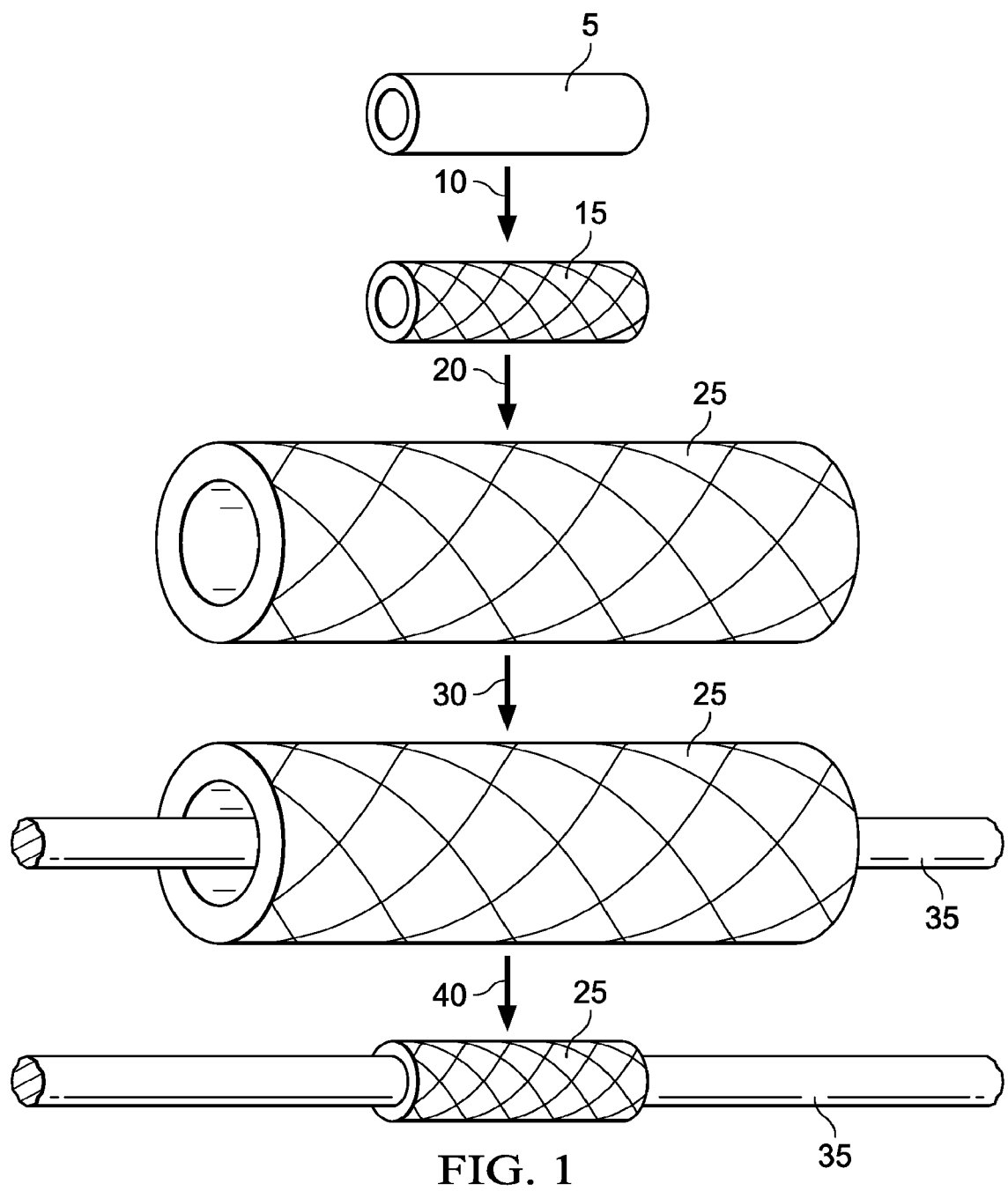
FIG. 1 illustrates a flow diagram of the manufacturing process and an example method of use of a heat-shrink elastomeric element in accordance with certain examples of the present disclosure.

The illustrated figures are exemplary only and are not intended to assert or imply any limitation with regard to the environment, architecture, design, or process in which different examples may be implemented.

DETAILED DESCRIPTION

The present disclosure relates to elastomeric elements used with downhole tools, and more particularly, to methods of using and methods of manufacturing heat-shrink elastomeric elements comprising thermoset shape memory polymers to provide versatile elastomeric elements for use with downhole tools or surface equipment for oilfield applications.

It is to be understood that the aspects described herein are not limited to a specific example, apparatus, or configuration, and as such can, of course, vary. It is also to be understood that the terminology used herein is for the purpose of describing particular aspects only and, unless specifically defined herein, is not intended to be limiting.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the examples of the present invention. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges some lower limits listed may be greater than some upper limits listed. One skilled in the art will recognize that the selected subset will require the selection of an upper limit in excess of the selected lower limit.

In this specification and in the claims that follow reference will be made to a number of terms that shall be defined to have the following meanings:

As used herein the term "rubbery modulus" (hereafter "Er") is the measured tensile storage modulus at a point that is 30° C. above the glass transition temperature (hereafter "$T_g$") of a disclosed thermoset shape memory polymer. Er could also refer to compressive modulus above $T_g$, shear modulus above $T_g$, or other metrics to assess stiffness in this regime.

As used herein the term "thermoset shape memory polymer" refers to a network (crosslinked) polymer possessing a $T_g$ and Er and the property such that when the polymer is brought to a temperature above its $T_g$ it can be deformed into a metastable state and then cooled below said transition, at which point said metastable state can be fixed. Reheating above the $T_g$ allows shape recovery at a force proportional to the rubbery modulus. Furthermore, the thermoset shape memory polymer has a gel fraction greater than 0.

The following chemical hierarchy is used throughout the specification to describe and enable the scope of the present disclosure and to particularly point out and distinctly claim the units which comprise the compounds of the present disclosure. However, unless otherwise specifically defined, the terms used herein are the same as those of the artisan of ordinary skill. The term "hydrocarbyl" stands for any carbon atom-based unit (organic molecule), said units optionally containing one or more organic functional group, including inorganic atom comprising salts, inter alia, carboxylate salts, quaternary ammonium salts. Within the broad meaning of the term "hydrocarbyl" are the classes "acyclic hydrocarbyl" and "cyclic hydrocarbyl" which terms are used to divide hydrocarbyl units into cyclic and non-cyclic classes.

As it relates to the following definitions, "cyclic hydrocarbyl" units can comprise only carbon atoms in the ring (i.e., carbocyclic and aryl rings) or can comprise one or more heteroatoms in the ring (i.e., heterocyclic and heteroaryl rings). For "carbocyclic" rings the lowest number of carbon atoms in a ring are 3 carbon atoms; cyclopropyl. For "aryl" rings the lowest number of carbon atoms in a ring are 6 carbon atoms; phenyl. For "heterocyclic" rings the lowest number of carbon atoms in a ring is 1 carbon atom; diaziridinyl. Ethylene oxide comprises 2 carbon atoms and is a $C_2$ heterocycle. For "heteroaryl" rings the lowest number of carbon atoms in a ring is 1 carbon atom; 1,2,3,4-tetrazolyl. The following is a non-limiting description of the terms "acyclic hydrocarbyl" and "cyclic hydrocarbyl" as used herein.

A. Substituted and Unsubstituted Acyclic Hydrocarbyl:

For the purposes of the present disclosure the term "substituted and unsubstituted acyclic hydrocarbyl" encompasses 3 categories of units:

1) linear or branched alkyl, non-limiting examples of which include, methyl ($C_1$), ethyl ($C_2$), n-propyl ($C_3$), iso-propyl ($C_3$), n-butyl ($C_4$), sec-butyl ($C_4$), iso-butyl ($C_4$), tert-butyl ($C_4$), and the like; substituted linear or branched alkyl, non-limiting examples of which includes, hydroxymethyl ($C_1$), chloromethyl ($C_1$), trifluoromethyl ($C_1$), aminomethyl ($C_1$), 1-chloroethyl ($C_2$), 2-hydroxyethyl ($C_2$), 1,2-difluoroethyl ($C_2$), 3-carboxypropyl ($C_3$), and the like.

2) linear or branched alkenyl, non-limiting examples of which include, ethenyl ($C_2$), 3-propenyl ($C_3$), 1-propenyl (also 2-methylethenyl) ($C_3$), isopropenyl (also 2-methylethen-2-yl) ($C_3$), buten-4-yl ($C_4$), and the like; substituted linear or branched alkenyl, non-limiting examples of which include, 2-chloroethenyl (also 2-chlorovinyl) ($C_2$), 4-hydroxybuten-1-yl ($C_4$), 7-hydroxy-7-methyloct-4-en-2-yl ($C_9$), 7-hydroxy-7-methyloct-3,5-dien-2-yl ($C_9$), and the like.

3) linear or branched alkynyl, non-limiting examples of which include, ethynyl ($C_2$), prop-2-ynyl (also propargyl) ($C_3$), propyn-1-yl ($C_3$), and 2-methyl-hex-4-yn-1-yl ($C_7$) substituted linear or branched alkynyl, non-limiting examples of which include, 5-hydroxy-5-methylhex-3-ynyl ($C_7$), 6-hydroxy-6-methylhept-3-yn-2-yl ($C_8$), 5-hydroxy-5-ethylhept-3-ynyl ($C_9$), and the like.

B. Substituted and Unsubstituted Cyclic Hydrocarbyl:

For the purposes of the present disclosure the term "substituted and unsubstituted cyclic hydrocarbyl" encompasses 5 categories of units:

1) The term "carbocyclic" is defined herein as "encompassing rings comprising from 3 to 20 carbon atoms, wherein the atoms which comprise said rings are limited to carbon atoms, and further each ring can be independently substituted with one or more moieties capable of replacing one or more hydrogen atoms." The following are non-limiting examples of "substituted and unsubstituted carbocyclic rings" which encompass the following categories of units:

i) carbocyclic rings having a single substituted or unsubstituted hydrocarbon ring, non-limiting examples of which include, cyclopropyl ($C_3$), 2-methyl-cyclopropyl ($C_3$), cyclopropenyl ($C_3$), cyclobutyl ($C_4$), 2,3-dihydroxycyclobutyl ($C_4$), cyclobutenyl ($C_4$), cyclopentyl ($C_5$), cyclopentenyl ($C_5$), cyclopentadienyl ($C_5$), cyclohexyl ($C_6$), cyclohexenyl ($C_6$), cycloheptyl ($C_7$), cyclooctanyl ($C_8$), 2,5-dimethylcyclopentyl ($C_5$), 3,5-dichlorocyclohexyl ($C_6$), 4-hydroxycyclohexyl ($C_6$), and 3,3,5-trimethylcyclohex-1-yl ($C_6$).

ii) carbocyclic rings having two or more substituted or unsubstituted fused hydrocarbon rings, non-limiting examples of which include, octahydropentalenyl ($C_8$), octahydro-1H-indenyl ($C_9$), 3a,4,5,6,7,7a-hexahydro-3H-inden-4-yl ($C_9$), decahydroazulenyl ($C_{10}$).

iii) carbocyclic rings which are substituted or unsubstituted bicyclic hydrocarbon rings, non-limiting examples of which include, bicyclo-[2.1.1]hexanyl, bicyclo[2.2.1]heptanyl, bicyclo[3.1.1]heptanyl, 1,3-dimethyl[2.2.1]heptan-2-yl, bicyclo[2.2.2]octanyl, and bicyclo[3.3.3]undecanyl.

2) The term "aryl" is defined herein as "units encompassing at least one phenyl or naphthyl ring and wherein there are no heteroaryl or heterocyclic rings fused to the phenyl or naphthyl ring, and further, each ring can be independently substituted with one or more moieties capable of replacing one or more hydrogen atoms." The following are non-limiting examples of "substituted and unsubstituted aryl rings" which encompass the following categories of units:

i) $C_6$ or $C_{10}$ substituted or unsubstituted aryl rings; phenyl and naphthyl rings whether substituted or unsubstituted, non-limiting examples of which include, phenyl ($C_6$), naphthylen-1-yl ($C_{10}$), naphthylen-2-yl ($C_{10}$), 4-fluorophenyl ($C_6$), 2-hydroxyphenyl ($C_6$), 3-methylphenyl ($C_6$), 2-amino-4-fluorophenyl ($C_6$), 2-(N,N-diethylamino)phenyl ($C_6$), 2-cyanophenyl ($C_6$), 2,6-di-tert-butylphenyl ($C_6$), 3-methoxyphenyl ($C_6$), 8-hydroxynaphthylen-2-yl ($C_{10}$), 4,5-dimethoxynaphthylen-1-yl ($C_{10}$), and 6-cyano-naphthylen-1-yl ($C_{10}$).

ii) $C_6$ or $C_{10}$ aryl rings fused with 1 or 2 saturated rings to afford $C_8$-$C_{20}$ ring systems, non-limiting examples of which include, bicyclo[4.2.0]octa-1,3,5-trienyl ($C_8$), and indanyl ($C_9$).

3) The terms "heterocyclic" and/or "heterocycle" are defined herein as "units comprising one or more rings having from 3 to 20 atoms wherein at least one atom in at least one ring is a heteroatom chosen from nitrogen (N), oxygen (O), or sulfur (S), or mixtures of N, O, and S, and wherein further the ring which contains the heteroatom is also not an aromatic ring." The following are non-limiting examples of "substituted and unsubstituted heterocyclic rings" which encompass the following categories of units:

i) heterocyclic units having a single ring containing one or more heteroatoms, non-limiting examples of which include, diazirinyl ($C_1$), aziridinyl ($C_2$), urazolyl ($C_2$), azetidinyl ($C_3$), pyrazolidinyl ($C_3$), imidazolidinyl ($C_3$), oxazolidinyl ($C_3$), isoxazolinyl ($C_3$), thiazolidinyl ($C_3$), isothiazolinyl ($C_3$), oxathiazolidinonyl ($C_3$), oxazolidinonyl ($C_3$), hydantoinyl ($C_3$), tetrahydrofuranyl ($C_4$), pyrrolidinyl ($C_4$), morpholinyl ($C_4$), piperazinyl ($C_4$), piperidinyl ($C_4$), dihydropyranyl ($C_5$), tetrahydropyranyl ($C_5$), piperidin-2-onyl (valerolactam) ($C_5$), 2,3,4,5-tetrahydro-1H-azepinyl ($C_6$), 2,3-dihydro-1H-indole ($C_8$), and 1,2,3,4-tetrahydroquinoline ($C_9$).

ii) heterocyclic units having 2 or more rings one of which is a heterocyclic ring, non-limiting examples of which include hexahydro-1H-pyrrolizinyl ($C_7$), 3a,4,5,6,7,7a-hexahydro-1H-benzo[d]imidazolyl ($C_7$), 3a,4,5,6,7,7a-hexahydro-1H-indolyl ($C_8$), 1,2,3,4-tetrahydroquinolinyl ($C_9$), and decahydro-1H-cycloocta[b]pyrrolyl ($C_{10}$).

4) The term "heteroaryl" is defined herein as "encompassing one or more rings comprising from 5 to 20 atoms wherein at least one atom in at least one ring is a heteroatom chosen from nitrogen (N), oxygen (O), or sulfur (S), or mixtures of N, O, and S, and wherein further at least one of the rings which comprises a heteroatom is an aromatic ring." The following are non-limiting examples of "substituted and unsubstituted heterocyclic rings" which encompass the following categories of units:

i) heteroaryl rings containing a single ring, non-limiting examples of which include, 1,2,3,4-tetrazolyl ($C_1$), [1,2,3]triazolyl ($C_2$), [1,2,4]triazolyl ($C_2$), triazinyl ($C_3$), thiazolyl ($C_3$), 1H-imidazolyl ($C_3$), oxazolyl ($C_3$), isoxazolyl ($C_3$), isothiazolyl ($C_3$), furanyl ($C_4$), thiophenyl ($C_4$), pyrimidinyl ($C_4$), 2-phenylpyrimidinyl ($C_4$), pyridinyl ($C_5$), 3-methylpyridinyl ($C_5$), and 4-dimethylaminopyridinyl ($C_5$)

ii) heteroaryl rings containing 2 or more fused rings one of which is a heteroaryl ring, non-limiting examples of which include: 7H-purinyl ($C_5$), 9H-purinyl ($C_5$), 6-amino-9H-purinyl ($C_5$), 5H-pyrrolo[3,2-d]pyrimidinyl ($C_6$), 7H-pyrrolo[2,3-d]pyrimidinyl ($C_6$), pyrido[2,3-d]pyrimidinyl ($C_2$), 2-phenylbenzo[d]thiazolyl ($C_2$), 1H-indolyl ($C_8$), 4,5,6,7-tetrahydro-1-H-indolyl ($C_8$), quinoxalinyl ($C_8$), 5-methylquinoxalinyl ($C_8$), quinazolinyl ($C_8$), quinolinyl ($C_9$), 8-hydroxy-quinolinyl ($C_9$), and isoquinolinyl ($C_9$).

5) $C_1$-$C_6$ tethered cyclic hydrocarbyl units (whether carbocyclic units, $C_6$ or $C_{10}$ aryl units, heterocyclic units, or heteroaryl units) which connected to another moiety, unit, or core of the molecule by way of a $C_1$-$C_6$ alkylene unit. Non-limiting examples of tethered cyclic hydrocarbyl units include benzyl $C_1$-($C_6$) having the formula:

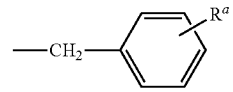

wherein $R^a$ is optionally one or more independently chosen substitutions for hydrogen. Further examples include other aryl units, inter alia, (2-hydroxyphenyl)hexyl $C_6$-($C_6$); naphthalen-2-ylmethyl $C_1$-($C_{10}$), 4-fluorobenzyl $C_1$-($C_6$), 2-(3-hydroxyphenyl)ethyl $C_2$-($C_6$), as well as substituted and unsubstituted $C_3$-$C_{10}$ alkylenecarbocyclic units, for example, cyclopropylmethyl $C_1$-($C_3$), cyclopentylethyl $C_2$-($C_5$), cyclohexylmethyl $C_1$-($C_6$). Included within this category are substituted and unsubstituted $C_1$-$C_{10}$ alkyleneheteroaryl units, for example a 2-picolyl $C_1$-($C_6$) unit having the formula:

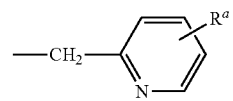

wherein $R^a$ is the same as defined above. In addition, $C_1$-$C_{12}$ tethered cyclic hydrocarbyl units include $C_1$-$C_{10}$alkyleneheterocyclic units and alkylene-heteroaryl units, non-limiting examples of which include, aziridinylmethyl $C_1$-($C_2$) and oxazol-2-ylmethyl $C_1$-($C_3$).

For the purposes of the present disclosure carbocyclic rings are from $C_3$ to $C_{20}$; aryl rings are $C_6$ or $C_{10}$; heterocyclic rings are from $C_1$ to $C_9$; and heteroaryl rings are from $C_1$ to $C_9$.

For the purposes of the present disclosure, and to provide consistency in defining the present disclosure, fused ring units, as well as spirocyclic rings, bicyclic rings and the like, which comprise a single heteroatom will be characterized and referred to herein as being encompassed by the cyclic family corresponding to the heteroatom containing ring, although the artisan may have alternative characterizations. For example, 1,2,3,4-tetrahydroquinoline having the formula:

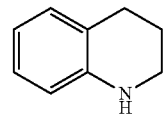

is, for the purposes of the present disclosure, considered a heterocyclic unit, 6,7-Dihydro-5H-cyclopentapyrimidine having the formula:

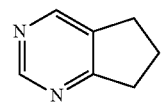

is, for the purposes of the present disclosure, considered a heteroaryl unit. When a fused ring unit contains heteroatoms in both a saturated ring (heterocyclic ring) and an aryl ring (heteroaryl ring), the aryl ring will predominate and determine the type of category to which the ring is assigned herein for the purposes of describing the invention. For example, 1,2,3,4-tetrahydro-[1,8]naphthpyridine having the formula:

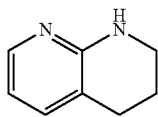

is, for the purposes of the present disclosure, considered a heteroaryl unit.

The term "substituted" is used throughout the specification. The term "substituted" is applied to the units described herein as "substituted unit or moiety is a hydrocarbyl unit or moiety, whether acyclic or cyclic, which has one or more hydrogen atoms replaced by a substituent or several substituents as defined herein below." The units, when substituting for hydrogen atoms, are capable of replacing one hydrogen atom, two hydrogen atoms, or three hydrogen atoms of a hydrocarbyl moiety at a time. In addition, these substituents can replace two hydrogen atoms on two adjacent carbons to form said substituent, new moiety, or unit. For example, a substituted unit that requires a single hydrogen atom replacement includes halogen, hydroxyl, and the like. A two hydrogen atom replacement includes carbonyl, oximino, and the like. A two hydrogen atom replacement from adjacent carbon atoms includes epoxy, and the like. Three hydrogen replacement includes cyano, and the like. The term substituted is used throughout the present specification to indicate that a hydrocarbyl moiety, inter alia, aromatic ring, alkyl chain, can have one or more of the hydrogen atoms replaced by a substituent. When a moiety is described as "substituted," any number of the hydrogen atoms may be replaced. For example, 4-hydroxyphenyl is a "substituted aromatic carbocyclic ring (aryl ring)", (N,N-dimethyl-5-amino)octanyl is a "substituted $C_8$ linear alkyl unit," 3-guanidinopropyl is a "substituted $C_3$ linear alkyl unit," and 2-carboxypyridinyl is a "substituted heteroaryl unit."

The following are non-limiting examples of units which can substitute for hydrogen atoms on a carbocyclic, aryl, heterocyclic, or heteroaryl unit:

i) $C_1$-$C_{12}$ linear, branched, or cyclic alkyl, alkenyl, and alkynyl; methyl ($C_1$), ethyl ($C_2$), ethenyl ($C_2$), ethynyl ($C_2$), n-propyl ($C_3$), iso-propyl ($C_3$), cyclopropyl ($C_3$), 3-propenyl ($C_3$), 1-propenyl (also 2-methylethenyl) ($C_3$), isopropenyl (also 2-methylethen-2-yl) ($C_3$), prop-2-ynyl (also propargyl) ($C_3$), propyn-1-yl ($C_3$), n-butyl ($C_4$), sec-butyl ($C_4$), iso-butyl ($C_4$), tert-butyl ($C_4$), cyclobutyl ($C_4$), buten-4-yl ($C_4$), cyclopentyl ($C_5$), cyclohexyl ($C_6$);

ii) substituted or unsubstituted $C_6$ or $C_{10}$ aryl; for example, phenyl, naphthyl (also referred to herein as naphthylen-1-yl ($C_{10}$) or naphthylen-2-yl ($C_{10}$));

iii) substituted or unsubstituted $C_6$ or $C_{10}$ alkylenearyl; for example, benzyl, 2-phenylethyl, naphthylen-2-ylmethyl;

iv) substituted or unsubstituted $C_1$-$C_9$ heterocyclic rings; as described herein below;

v) substituted or unsubstituted $C_1$-$C_9$ heteroaryl rings; as described herein below;

vi) $-(CR^{102a}R^{102b})_aOR^{101}$; for example, $-OH$, $-CH_2OH$, $-OCH_3$, $-CH_2OCH_3$, $-OCH_2CH_3$, $-CH_2OCH_2CH_3$, $-OCH_2CH_2CH_3$, and $-CH_2OCH_2CH_2CH_3$;

vii) $-(CR^{102a}R^{102b})_aC(O)R^{101}$; for example, $-COCH_3$, $-CH_2COCH_3$; $-COCH_2CH_3$, $-CH_2COCH_2CH_3$, $-COCH_2CH_2CH_3$, and $-CH_2COCH_2CH_2CH_3$;

viii) $-(CR^{102a}R^{102b})_aC(O)OR^{101}$; for example, $-CO_2CH_3$, $-CH_2CO_2CH_3$, $-CO_2CH_2CH_3$, $-CH_2CO_2CH_2CH_3$, $-CO_2CH_2CH_2CH_3$, and $-CH_2CO_2CH_2CH_2CH_3$;

ix) $-(CR^{102a}R^{102b})_aC(O)N(R^{101})_2$; for example, $-CONH_2$, $-CH_2CONH_2$; $-CONHCH_3$, $-CH_2CONHCH_3$, $-CON(CH_3)_2$, and $-CH_2CON(CH_3)_2$;

x) $-(CR^{102a}R^{102b})_aN(R^{101})_2$; for example, $-NH_2$, $-CH_2NH_2$, $-NHCH_3$, $-CH_2NHCH_3$, $-N(CH_3)_2$, and $-CH_2N(CH_3)_2$;

xi) halogen; $-F$, $-Cl$, $-Br$, and $-I$;

xii) $-(CR^{102a}R^{102b})_aCN$;

xiii) $-(CR^{102a}R^{102b})_aNO_2$;

xiv) $-CH_jX_k$; wherein X is halogen, the index j is an integer from 0 to 2, j+k=3; for example, $-CH_2F$, $-CF_3$, $-CCl_3$, or $-CBr_3$;

xv) $-(CR^{102a}R^{102b})_aSR^{101}$; $-SH$, $-CH_2SH$, $-SCH_3$, $-CH_2SCH_3$, $-SC_6H_5$, and $-CH_2SC_6H_5$;

xvi) $-(CR^{102a}R^{102b})_aSO_2R^{101}$; for example, $-SO_2H$, $-CHSO_2H$, $-SO_2CH_3$, $-CH_2SO_2CH_3$, $-SO_2C_6H_5$, and $-CH_2SO_2C_6H_5$; and xvii) $-(CR^{102a}R^{102b})_aSO_3R^{101}$; for example, $-SO_3H$, $-CH_2SO_3H$, $-SO_3CH_3$, $-CH_2SO_3CH_3$, $-SO_3C_6H_5$, and $-CH_2SO_3C_6H_5$; wherein each $R^{101}$ is independently hydrogen, substituted or unsubstituted $C_1$-$C_6$ linear, branched, or cyclic alkyl, phenyl, benzyl, heterocyclic, or heteroaryl; or two $R^{101}$ units can be taken together to form a ring comprising 3-7 atoms; $R^{102a}$ and $R^{102b}$ are each independently hydrogen or $C_1$-$C_4$ linear or branched alkyl; the index "a" is from 0 to 4.

Examples of the methods described herein comprise the manufacture of heat-shrink elastomeric elements comprising thermoset shape memory polymers and the use of the heat-shrink elastomeric elements with downhole tools and/or surface equipment. The heat-shrink elastomeric elements may be manufactured from amorphous thermoplastic polymers that have been conventionally processed (e.g., injection molding, blow molding, extruding, spinning, drawing, transfer molding, foam formation, supercritical foaming, and the like) into a desired shape or configuration. A process known in the art as mnemosynation is then used to convert the thermoplastic polymers into thermosetting shape memory polymers and fix the shape of the material into its globally neutral state. The shaped material may then be heated above its $T_g$ and stretched into a metastable shape with desired dimensions and held until cooled below $T_g$ to provide the heat-shrink elastomeric element. The heat-shrink elastomeric element may then be used with a downhole tool or surface equipment as desired (e.g., a heat-shrink elastomeric packer may be fitted over and positioned on a section of tubing). After placement, heat may be applied to the heat-shrink elastomeric element to shrink the heat-shrink elastomeric element to the shape defined by the globally neutral state which was fixed after the process of mnemosynation.

The heat-shrink elastomeric elements may be used with downhole tools or surface equipment (e.g., a heat-shrink elastomeric packer may be fitted over a section of tubing. As another example, a heat-shrink elastomeric o-ring may be used as a sealing element in a pump. In all examples the heat-shrink elastomeric elements may be stretched or otherwise adjusted into a desired metastable shape prior to use with downhole tools or surface equipment. The dimensions of the metastable shape may be altered as desired to fit the heat-shrink elastomeric element with a specific downhole tool or surface equipment such that the heat-shrink elastomeric element may be sufficiently configured to fit over the outer diameter of a specific downhole tool or surface equipment and may also be unhindered by profile variances in the specific downhole tool or surface equipment. As such, the heat-shrink elastomeric element may be used to provide a sealing or clamping element around a downhole tool or surface equipment of a dimension greater than the fixed shape of the globally neutral state produced from the mnemosynation process. Moreover, the mnemosynation process may allow selective tuning of the properties (e.g., shrinkability, swellability, elasticity) of the heat-shrink elastomeric element, potentially allowing sections of the heat-shrink elastomeric element to react differently to exposure to external factors such as heat, solvents, fluids, etc.

FIG. 1 illustrates a flow diagram of the manufacturing process and an example method of use of a heat-shrink elastomeric element in accordance with certain examples of the present disclosure. Thermoplastic elastomeric element 5 is a processed (e.g., injection molding, extrusion, etc.) amorphous thermoplastic polymer configured to possess a desired shape. A mnemosynation process 10 (as illustrated by the arrow indicating reference marker 10) is applied to the thermoplastic elastomeric element 5. The mnemosynation process 10 comprises exposure to a radiation dose of approximately 5 to 300 kilogray (hereafter "kGy") to induce crosslinks within the thermoplastic elastomeric element 5. This process converts the amorphous thermoplastic polymer of the thermoplastic elastomeric element 5 into a thermoset shape memory polymer to provide a thermoset elastomeric element 15. The mnemosynation process 10 fixes the shape of the thermoset elastomeric element 15 in its globally neutral state. A metastable shape programming process 20 (as illustrated by the arrow indicating reference marker 20) is applied to the thermoset elastomeric element 15. The metastable shape programming process 20 comprises heating the thermoset elastomeric element 15 to or above its $T_g$ and then physically adjusting the thermoset elastomeric element 15 into a metastable shape of sufficient dimensions for a desired application. When the metastable shape is obtained, the thermoset elastomeric element 15 is cooled below its $T_g$, which fixes the metastable shape to provide the heat-shrink elastomeric element 25. The heat-shrink elastomeric element 25 may then be deployed and used with a downhole tool or surface equipment. The deployment process 30 (as illustrated by the arrow indicating reference marker 30) is the process of fitting the heat-shrink elastomeric element 25 over a downhole tool or surface equipment, illustrated as tubing 35, and then positioning the heat-shrink elastomeric element 25 on the tubing 35. The deployment process 30 may comprise fitting the heat-shrink elastomeric element 25 over a collar, shoe, or other variance in the profile of the tubing 35. When positioned as desired, the heat-shrink elastomeric element 25 may be heated to or above its $T_g$, this heating process 40 is illustrated by the arrow indicating reference marker 40, to shrink the heat-shrink elastomeric element 25 around the tubing 35. The heat-shrink elastomeric element 25 retains the properties of a thermoset polymer after shrinkage. The heat-shrink elastomeric element 25 also retains the properties of the specific polymer used to manufacture it. For example, the amorphous polymer may swell when exposed to oil or other hydrocarbons, allowing the heat-shrink elastomeric element 25 to be used as a swellable packer downhole.

Figure 2:
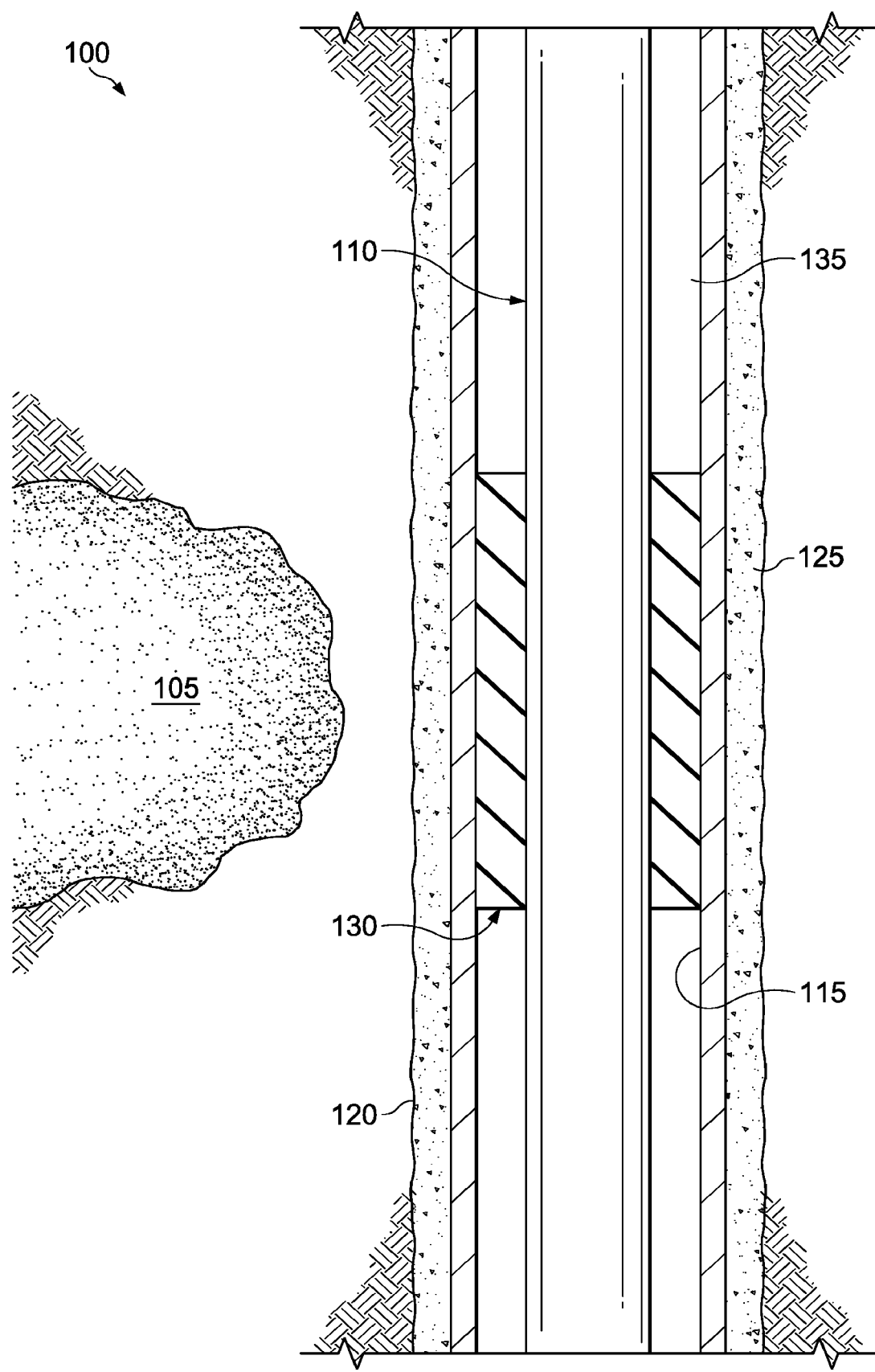
FIG. 2 is a schematic of a cross-section of an example well system comprising a heat-shrink elastomeric element in accordance with certain examples of the present disclosure.

FIG. 2 is a schematic of a cross-section of an example well system 100 comprising a heat-shrink elastomeric element in accordance with certain examples of the present disclosure. Well system 100 is disposed within subterranean formation 105 and comprises a downhole tool, tubing 110, disposed within a casing 115 that is cemented into place within the wellbore 120 with cement sheath 125. Tubing 110 may be any type of conduit used for conveyance of materials. Examples of tubing 110 may include, but are not limited to, tubing, piping, casing, etc. Well system 100 further comprises a heat-shrink elastomeric element, specifically, a heat-shrink elastomeric swellable packer 130 that has been deployed onto tubing 110 and heated to seal the heat-shrink elastomeric swellable packer 130 around the tubing 110. The tubing 110 with the heat-shrink elastomeric swellable packer 130 was then inserted into wellbore 120. The heat-shrink elastomeric swellable packer 130 has been used to form an annular seal in casing annulus 135 formed between tubing 110 and casing 115. When contacted with fluids that induce swelling, for example, oleaginous fluids, the heat-shrink elastomeric swellable packer 130 swells to form the annular seal in the casing annulus 135 by swelling and expanding to press the outer diameter of the heat-shrink elastomeric swellable packer 130 against the inner diameter of the casing 115. In the example of FIG. 1, although the wellbore 120 is lined with casing 115 and cement sheath 125, it is to be understood that the wellbore could be uncased, open hole, or that the heat-shrink elastomeric swellable packer 130 could be inserted between any concentric tubing or other conduits present.

Figure 3:
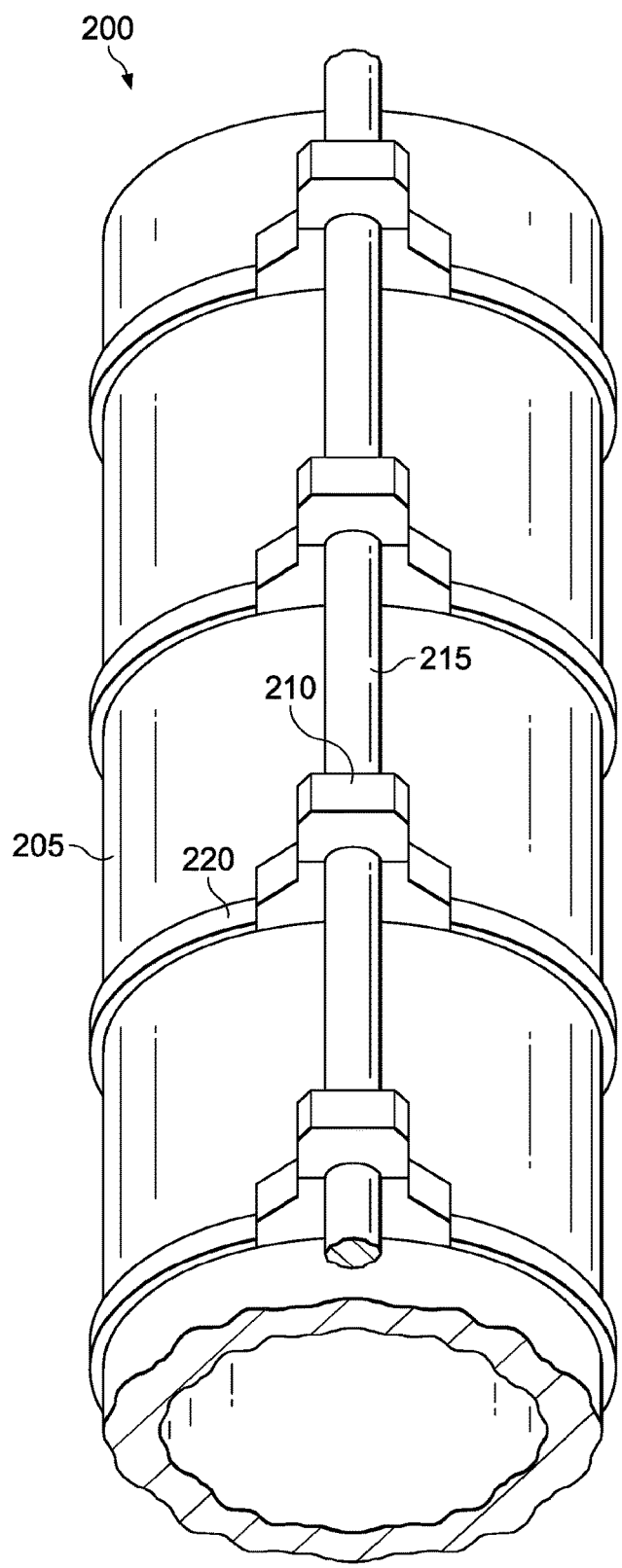
FIG. 3 is a schematic of an isometric view of another example well system comprising a heat-shrink elastomeric element in accordance with certain examples of the present disclosure.

FIG. 3 is a schematic of an isometric view of an example well system 200 comprising a heat-shrink elastomeric element in accordance with certain examples of the present disclosure. Well system 200 comprises tubing 205, cable clamp 210, and cable 215. Tubing 205 may be any type of conduit used for conveyance of materials. Examples of tubing 205 may include, but are not limited to, tubing, piping, casing, etc. Tubing 205 may be the same or a different type of tubing as tubing 110 illustrated in FIG. 2. A heat-shrink elastomeric element, specifically a heat-shrink elastomeric support band 220, is affixed to and a component of cable clamp 210. The heat-shrink elastomeric support band 220 has been deployed onto tubing 205 to position the cable clamp 210 as desired. The heat-shrink elastomeric support band 220 has been heated to seal the heat-shrink elastomeric support band 220 around the tubing 205. Cable 215 has been fastened to cable clamp 210, and cable clamp 210 has clamped cable 215 to tubing 205. A single or plurality of cable clamps 210 with heat-shrink elastomeric support bands 220 may be used to clamp cable 215 to tubing 205.

Figure 4:
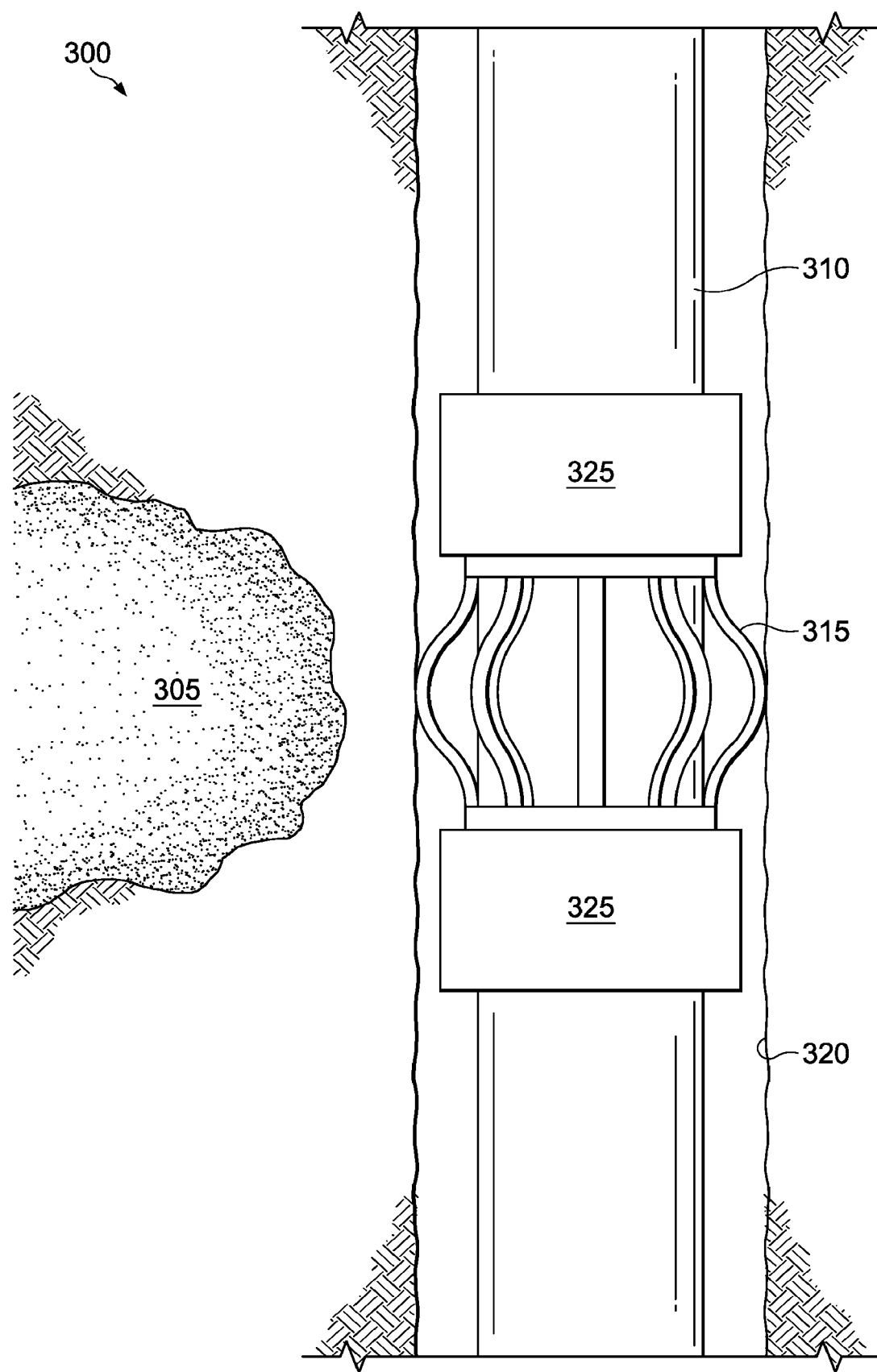
FIG. 4 is a schematic of a cross-section of another example well system comprising a heat-shrink elastomeric element in accordance with certain examples of the present disclosure.

FIG. 4 is a schematic of a cross-section of a well system 300 comprising a heat-shrink elastomeric element in accordance with certain examples of the present disclosure. Well system 300 is disposed within subterranean formation 305. Well system 300 comprises casing 310 and a bow-spring centralizer 315. Casing 310 may be any type of casing used for conveyance of materials. Examples of casing 310 may include, but are not limited to, production casing, surface casing, intermediate casing, conductor casing, etc. The bow-spring centralizer 315 may center casing 310 in wellbore 320. A heat-shrink elastomeric element, specifically a heat-shrink elastomeric support band 325, is affixed to both of the terminal ends of bow-spring centralizer 315 to secure and fasten the bow-spring portion of the bow-spring centralizer 315 to casing 310. The heat-shrink elastomeric support bands 325 have been deployed onto casing 310 to position the bow-spring centralizer 315 as desired. The heat-shrink elastomeric support bands 325 have been heated to seal the heat-shrink elastomeric support bands 325 around the casing 310. The bow-spring centralizer 315 may then be used to maintain the casing 310 in the center of wellbore 320. A single or plurality of bow-spring centralizers 315 with heat-shrink elastomeric support bands 325 may be used to maintain the position of the casing 310 in the wellbore 320.

Figure 5:
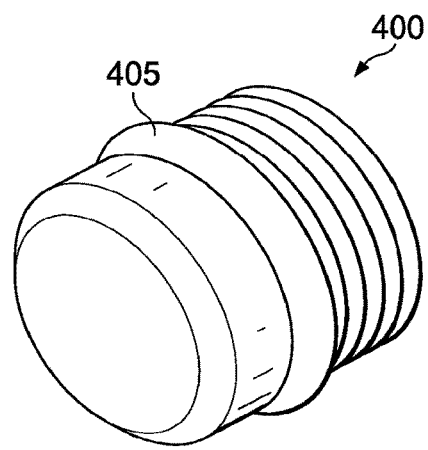
FIG. 5 is a schematic of an isometric view of a heat-shrink elastomeric o-ring used with an example pump sealing element in accordance with certain examples of the present disclosure.

FIG. 5 is a schematic of an isometric view of an o-ring 405 deployed on an example pump sealing element 400 in accordance with certain examples of the present disclosure. The pump sealing element 400 may be a component of a downhole tool or surface equipment and may be used with pumps or similar equipment. The pump sealing element 400 comprises a heat-shrink elastomeric element, specifically a heat-shrink elastomeric o-ring 405. The heat-shrink elastomeric o-ring 405 may be fitted around an end of the pump sealing element 400 and positioned on the pump sealing element 400 as desired. When positioned, the heat-shrink elastomeric o-ring 405 may be heated to shrink the heat-shrink elastomeric o-ring 405 around the desired position. The heat-shrink elastomeric o-ring 405 may then function as a sealing element for the pump sealing element 400. Although the heat-shrink elastomeric o-ring 405 is depicted as being used with a pump sealing element 400, it is to be understood that a heat-shrink elastomeric o-ring 405 as described and produced herein may be used with any downhole tool or surface equipment as desired and may substitute for any traditional o-ring. Alternatively, the heat-shrink elastomeric o-ring 405 may be positioned on downhole tools or surface equipment at locations where placement of traditional o-rings may be difficult or impossible.

The heat-shrink elastomeric elements (e.g., heat-shrink elastomeric element 25 as illustrated in FIG. 1) may be used in a variety of applications (e.g., as sealing elements, clamping elements, actuating elements, etc.). Specific examples of applications include, but are not limited to, any type of packer, clamps, grips, heat-activated actuators, o-rings, bundling elements, positioning elements (e.g., the heat-shrink elastomeric element is used to position a downhole tool, surface equipment, or component thereof).

The thermoset shape memory polymers used to produce the heat-shrink elastomeric elements may have a $T_g$ of from about $-40°$ C. to about $200°$ C. In one example, the disclosed thermoset shape memory polymers have a $T_g$ of from about $0°$ C. to about $200°$ C. In another example, the disclosed thermoset shape memory polymers have a $T_g$ of from about $10°$ C. to about $150°$ C. In a further example, the disclosed thermoset shape memory polymers have a $T_g$ of from about $20°$ C. to about $100°$ C. In a still further example, the disclosed thermoset shape memory polymers have a $T_g$ of from about $50°$ C. to about $200°$ C. In a yet further example, the disclosed thermoset shape memory polymers have a $T_g$ of from about $0°$ C. to about $70°$ C. In yet another example, the disclosed thermoset shape memory polymers have a $T_g$ of from about $-40°$ C. to about $20°$ C.

The disclosed thermoset shape memory polymers may have an Er of from about 0.01 MPa to about 100 MPa. In one example, the disclosed thermoset shape memory polymers have an Er of from about 0.01 MPa to about 15 MPa. In another example, the disclosed thermoset shape memory polymers have an Er of from about 1 MPa to about 10 MPa. In a further example, the disclosed thermoset shape memory polymers have an Er of from about 1 MPa to about 5 MPa. In a yet further example, the disclosed thermoset shape memory polymers have an Er of from about 1 MPa to about 3 MPa. In a still further example, the disclosed thermoset shape memory polymers have an Er of from about 0.01 MPa to about 10 MPa. In yet another example, the disclosed thermoset shape memory polymers have an Er of from about 0.01 MPa to about 5 MPa. In a yet still further example, the disclosed thermoset shape memory polymers have an Er of from about 0.01 MPa to about 3 MPa. The disclosed thermoset shape memory polymers, however, can have any value of Er from about 0.01 MPa to about 100 MPa, for example, 1.0 MPa, 1.1 MPa, 1.2 MPa, 1.3 MPa, 1.4 MPa, 1.5 MPa, 1.6 MPa, 1.7 MPa, 1.8 MPa, 1.9 MPa, 2.0 MPa, 2.1 MPa, 2.2 MPa, 2.3 MPa, 2.4 MPa, 2.5 MPa, 2.6 MPa, 2.7 MPa, 2.8 MPa, 2.9 MPa, 3.0 MPa, 5.0 MPa, 10.0 MPa, 20.0 MPa, 40.0 MPa, 60.0 MPa, 80.0 MPa, or 100.0 MPa.

The disclosed thermoset shape memory polymers have a gel fraction greater than 0. In one example, the disclosed thermoset shape memory polymers have a gel fraction greater than about 50%. In another example, the disclosed thermoset shape memory polymers have a gel fraction greater than about 60%. In a further example, the disclosed thermoset shape memory polymers have a gel fraction greater than about 70%. In a still further example, the disclosed thermoset shape memory polymers have a gel fraction greater than about 80%. In a yet further example, the disclosed thermoset shape memory polymers have a gel fraction greater than about 90%. In a still yet further example, the disclosed thermoset shape memory polymers have a gel fraction greater than about 95%. In a still yet further example, the disclosed thermoset shape memory polymers have a gel fraction greater than about 98%.

The disclosed thermoset shape memory polymers have an average molecular weight greater than about 20,000 Daltons. In one example, the average molecular weight of the disclosed thermoset shape memory polymers is from about 40,000 Daltons to about 65,000 Daltons. In another example, the average molecular weight of the disclosed thermoset shape memory polymers is from about 40,000 Daltons to about 50,000 Daltons. In another example, the average molecular weight of the disclosed thermoset shape memory polymers is from about 200,000 Daltons to about 5,000,000 Daltons. In another example, the average molecular weight of the disclosed thermoset shape memory polymers is greater than 4,000,000 Daltons. In a further example, the average molecular weight of the disclosed thermoset shape memory polymers is from about 100,000 Daltons to about 1,000,000 Daltons. In a still further example, the average molecular weight of the disclosed thermoset shape memory polymers is from about 400,000 Daltons to about 750,000 Daltons.

Generally, the disclosed thermoset shape memory polymers comprise backbones of acrylates, acrylamides, or urethanes. For example, the thermoset shaped memory polymers may comprise backbones comprising two or more of the following monomers:

i) acrylates having the formula:

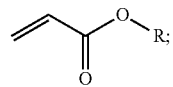

and/or ii) acrylamides having the formula:

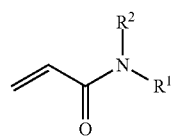

wherein R, R$^1$ and R$^2$ are each independently is chosen from:
 i) hydrogen;
 ii) C$_1$-C$_{20}$ linear alkyl; for example, methyl (C$_1$), ethyl (C$_2$), n-propyl (C$_3$), n-butyl (C$_4$), n-pentyl (C$_5$), n-hexyl (C$_6$), n-heptyl (C$_7$), n-octyl (C$_8$), n-nonyl (C$_9$), n-decyl (C$_{10}$), and the like;
 iii) C$_3$-C$_{20}$ branched alkyl; for example, iso-propyl (C$_3$), sec-butyl (C$_4$), iso-butyl (C$_4$), tert-butyl (C$_4$), and the like;
 iv) C$_3$-C$_{20}$ cyclic alkyl; for example, cyclopropyl (C$_3$), cyclobutyl (C$_4$), cyclopentyl (C$_5$), cyclohexyl (C$_6$), cycloheptyl (C$_7$), and the like;
 v) C$_5$-C$_{20}$ bicyclic alkyl; for example, 1-methylbicyclo [2.2.1]heptan-2-yl acrylate, 7,7-dimethylbicyclo[2.2.1]heptan-2-yl acrylate, 1,7,7-trimethyl-bicyclo[2.2.1]heptan-2-yl acrylate, 1,3,3-trimethylbicyclo[2.2.1]heptan-2-yl acrylate, 2,6,6-trimethylbicyclo[3.1.1]heptan-2-yl acrylate, and the like;
 vi) C$_5$-C$_{20}$ fused ring alkyl; octahydropentalene, octahydro-1H-indene, decahydronaphthalene (decalin), and the like;
 vii) C$_1$-C$_{20}$ heterocyclic; diazirinyl (C$_1$), aziridinyl (C$_2$), urazolyl (C$_2$), azetidinyl (C$_3$), pyrazolidinyl (C$_3$), imidazolidinyl (C$_3$), oxazolidinyl (C$_3$), isoxazolidinyl (C$_3$), thiazolidinyl (C$_3$), isothiazolinyl (C$_3$), oxathiazolidinonyl (C$_3$), oxazolidinonyl (C$_3$), hydantoinyl (C$_3$), tetrahydropyranyl (C$_4$), pyrrolidinyl (C$_4$), morpholinyl (C$_4$), piperazinyl (C$_4$), piperidinyl (C$_4$), dihydropyranyl (C$_5$), tetrahydropyranyl (C$_5$), piperidin-2-onyl (valerolactam) (C$_5$), 2,3,4,5-tetrahydro-1H-azepinyl (C$_6$), 2,3-dihydro-1H-indole (C$_8$), 1,2,3,4-tetrahydro-quinoline (C$_9$), and the like;
 viii) C$_1$-C$_{20}$ heteroaryl; for example, 1,2,3,4-tetrazolyl (C$_1$), [1,2,3]triazolyl (C$_2$), [1,2,4]triazolyl (C$_2$), triazinyl (C$_3$), thiazolyl (C$_3$), 1H-imidazolyl (C$_3$), oxazolyl (C$_3$), isoxazolyl (C$_3$), isothiazolyl (C$_3$), furanyl (C$_4$), thiopheneyl (C$_4$), pyrimidinyl (C$_4$), pyridinyl (C$_5$), and the like;
 ix) C$_4$-C$_{20}$ heterobicyclic; 5-azabicyclo[2.1.1]hexanyl, 7-oxabicyclo[2.2.1]-heptanyl, 7-azabicyclo[2.2.1]heptanyl, 2-azabicyclo[2.2.2]octanyl, and the like;
 x) C$_6$ or C$_{10}$ aryl; or
 xi) C$_7$-C$_{20}$ alkylenearyl; for example, benzyl, 2-phenylethyl, and the like;
or R$^1$ and R$^2$ can be taken together to form:
 i) a substituted or unsubstituted ring having from 3 to 20 atoms and optionally from 1 to 3 heteroatoms in addition to the nitrogen atom to which R$^1$ and R$^2$ are bonded;
 ii) a fused ring system containing from 2 to 4 rings having a total of from 3 to 20 atoms in addition to the nitrogen atom to which R$^1$ and R$^2$ are bonded; or
 iii) a bicyclic ring system having a total of from 4 to 20 atoms in addition to the nitrogen atom to which R$^1$ and R$^2$ are bonded.
The substitutions for hydrogen atoms on R, R$^1$ and R$^2$ or on the rings formed by R$^1$ and R$^2$ are independently chosen from:
 i) C$_1$-C$_{12}$ linear, C$_3$-C$_{12}$ branched, or C$_3$-C$_{12}$ cyclic alkyl, alkenyl, and alkynyl;
 ii) substituted or unsubstituted C$_6$ or C$_{10}$ aryl;
 iii) substituted or unsubstituted C$_6$ or C$_{10}$ alkylenearyl;
 iv) substituted or unsubstituted C$_1$-C$_9$ heterocyclic rings;
 v) substituted or unsubstituted C$_1$-C$_9$ heteroaryl rings;
 vi) —(CR$^{102a}$R$^{102b}$)$_a$OR$^{101}$;
 vii) —(CR$^{102a}$R$^{102b}$)$_a$C(O)R$^{101}$;
 viii) —(CR$^{102a}$R$^{102b}$)$_a$C(O)R$^{101}$;
 ix) —(CR$^{102a}$R$^{102b}$)$_a$C(O)N(R$^{101}$)$_2$;
 x) —(CR$^{102a}$R$^{102b}$)$_a$N(R$^{101}$)$_2$;
 xi) halogen;
 xii) —(CR$^{102a}$R$^{102b}$)$_a$CN;
 xiii) —(CR$^{102a}$R$^{102b}$)$_a$NO$_2$;
 xiv) —CH$_j$X$_k$; wherein X is halogen, the index j is an integer from 0 to 2, j+k=3;
 xv) —(CR$^{102a}$R$^{102b}$)$_a$SR$^{101}$;
 xvi) —(CR$^{102a}$R$^{102b}$)$_a$SO$_2$R$^{101}$; or
 xvii) —(CR$^{102a}$R$^{102b}$)$_a$SO$_3$R$^{101}$;
wherein each R$^{101}$ is independently hydrogen, substituted or unsubstituted C$_1$-C$_6$ linear, C$_3$-C$_6$ branched, or C$_3$-C$_6$ cyclic alkyl, phenyl, benzyl, heterocyclic, or heteroaryl; or two R$^{101}$ units can be taken together to form a ring comprising 3-7 atoms; R$^{102a}$ and R$^{102b}$ are each independently hydrogen or C$_1$-C$_4$ linear or C$_3$-C$_4$ branched alkyl; the index "a" is from 0 to 4.

In one example of the disclosed thermoset shape memory polymers, the backbones may comprise one or more acrylates wherein each R unit is independently chosen from:
 i) substituted or unsubstituted C$_1$-C$_6$ linear alkyl;
 ii) substituted or unsubstituted C$_3$-C$_6$ branched alkyl;
 iii) substituted or unsubstituted C$_3$-C$_6$ cyclic alkyl;
 iv) substituted or unsubstituted C$_6$-C$_{20}$ bicyclic alkyl;
 v) substituted or unsubstituted C$_6$ or C$_{10}$ aryl;
 vi) substituted or unsubstituted C$_7$-C$_{20}$ alkylenearyl; or
 vii) substituted or unsubstituted C$_1$-C$_{20}$ heterocyclic.

The R units of this example can be substituted with one or more units independently chosen from:
 i) C$_1$-C$_6$ linear alkyl;
 ii) C$_3$-C$_6$ branched alkyl;
 iii) C$_3$-C$_6$ cyclic alkyl;
 iv) halogen; or
 v) —C(O)OH.

In one iteration of this example, the polymer backbone comprises one or more monomers chosen from methyl acrylate, ethyl acrylate, n-propyl acrylate, iso-propyl acrylate, cyclopropyl acrylate, n-butyl acrylate, iso-butyl acrylate, sec-butyl acrylate, tert-butyl acrylate, cyclobutyl acrylate, n-pentyl acrylate, cyclopentyl acrylate, n-hexyl acrylate, cyclohexyl acrylate, or 4-tert-butylcyclohexyl acrylate.

In another iteration of this example, the polymer backbone comprises one or more monomers chosen from bicyclo [1.1.1]pentan-1-yl acrylate, bicyclo[1.1.1]pentan-2-yl acrylate, bicyclo[2.1.1]hexan-1-yl acrylate, bicyclo[2.1.1]hexan-2-yl acrylate, bicyclo[2.1.1]hexan-6-yl acrylate, bicyclo [2.2.1]heptan-1-yl acrylate, bicyclo[2.2.1]heptan-2-yl acrylate, 1-methylbicyclo[2.2.1]heptan-2-yl acrylate, 7,7-dimethylbicyclo[2.2.1]heptan-2-yl acrylate, 1,7,7-trimethylbicyclo[2.2.1]heptan-2-yl acrylate, 1,3,3-trimethylbicyclo [2.2.1]-heptan-2-yl acrylate, or 2,6,6-trimethylbicyclo-[3.1.1]heptan-2-yl acrylate.

In a further iteration of this example, the polymer backbone comprises one or more monomers chosen from phenyl acrylate, 2-chlorophenyl acrylate, 3-chlorophenyl acrylate, 4-chlorophenyl acrylate, 2-methylphenyl acrylate, 3-methylphenyl acrylate, 4-methylphenyl acrylate, benzyl acrylate, 2-chlorobenzyl acrylate, 3-chlorobenzyl acrylate, 4-chlorobenzyl acrylate, 2-methylbenzyl acrylate, 3-methylbenzyl acrylate, or 4-methylbenzyl acrylate.

In another example of the disclosed thermoset shape memory polymers, the backbones may comprise one or more acrylamides wherein each R$^1$ and R$^2$ unit is independently chosen from:
 i) substituted or unsubstituted C$_1$-C$_6$ linear alkyl;
 ii) substituted or unsubstituted C$_3$-C$_6$ branched alkyl;
 iii) substituted or unsubstituted C$_3$-C$_6$ cyclic alkyl;
 iv) substituted or unsubstituted C$_6$-C$_{20}$ bicyclic alkyl;
 v) substituted or unsubstituted C$_6$ or C$_{10}$ aryl;

vi) substituted or unsubstituted $C_7$-$C_{20}$ alkylenearyl; or vii) substituted or unsubstituted $C_1$-$C_{20}$ heterocyclic.

In one iteration of this example, the polymer backbone comprises one or more monomers chosen from acrylamide, N-methylacrylamide, N,N-dimethylacrylamide, N-ethylacrylamide, N,N-diethylacrylamide, N-methyl-N-ethylacrylamide, N-isopropylacrylamide, N,N-diisopropylacrylamide, N-cyclopropylacrylamide, N,N-dicyclopropylacrylamide, N-acryloylaziridine (1-(aziridin-1-yl)prop-2-en-1-one), N-acryloylazetidine (1-(azetidin-1-yl)prop-2-en-1-one), N-acryloylpyrrolidine (1-(pyrrolidin-1-yl)prop-2-en-1-one), 4-acryloylmorpholine (1-morpholinoprop-2-en-1-one), N-acryloylpiperidine (1-(piperidin-1-yl)prop-2-en-1-one), or N-acryloylpiperazine (1-(piperazin-1-yl)prop-2-en-1-one).

In another aspect of this category of the disclosed shape memory polymers, the backbones comprise:
i) from about 1% to about 30% by weight of a first monomer; and
ii) from about 70% to about 99% by weight of a second monomer.

In one example of this aspect, the backbones comprise:
i) from about 1% to about 30% by weight of butyl acrylate; and
ii) from about 70% to about 99% by weight of methyl acrylate.

One iteration of this example includes backbones comprising from about 10% to about 30% by weight of butyl acrylate. In another iteration, the polymer backbones comprise from about 15% to about 25% by weight of butyl acrylate. In a further iteration, the polymer backbones comprise from about 20% by weight of butyl acrylate.

Another iteration of this example includes backbones comprising from about 80% by weight of methyl acrylate. In another iteration, the polymer backbones comprise from about 75% to about 85% by weight of methyl acrylate.

In a further aspect of the disclosed shape memory polymers, the backbones comprise:
i) from about 0.1% to about 99% by weight of a first monomer;
ii) from about 0.1% to about 99% by weight of a second monomer; and
iii) from about 0.1% to about 99% by weight of a third monomer.

In some other examples, the thermosetting shape memory polymers may have backbones comprising urethane linkages formed by reacting the following monomers:
i) at least one diisocyanate having the formula: O═C═N—W—N═C═O; and
ii) at least one diol having the formula: HO-D-OH;
wherein W is chosen from:
i) substituted or unsubstituted $C_1$-$C_{20}$ linear alkylene, $C_3$-$C_{20}$ branched alkylene, or $C_3$-$C_{20}$ cyclic alkylene; for example, methylene ($C_1$), ethylene ($C_2$), n-propylene ($C_3$), n-butylene ($C_4$), n-pentylene ($C_5$), n-hexylene ($C_6$), n-heptylene ($C_7$), 3-methylhexylene ($C_7$), n-octylene ($C_8$), n-nonylene ($C_9$), n-decylene ($C_{10}$), and the like;
ii) substituted or unsubstituted $C_2$-$C_{20}$ linear alkenylene, $C_3$-$C_{20}$ branched alkenylene, or $C_5$-$C_{20}$ cyclic alkenylene; for example, (E)-hept-3-enylene and (Z)-oct-2-enylene;
iii) substituted or unsubstituted $C_2$-$C_{20}$ linear alkynylene or $C_3$-$C_{20}$ branched alkynylene;
iv) substituted or unsubstituted arylene; for example, 1,3-phenylene, 1,4-phenylene, 1,5-naphthylene
v) substituted or unsubstituted alkylenearylene; for example, a ($C_7$) unit having the formula:

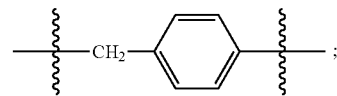

vi) substituted or unsubstituted alkylenearylalkylene; for example, a ($C_8$) unit having the formula:

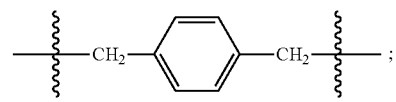

vii) substituted or unsubstituted heterocycylene; for example units having the formula:

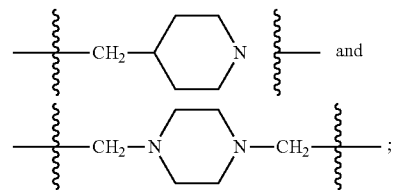

and viii) substituted or unsubstituted heteroarylene; for example units having the formula:

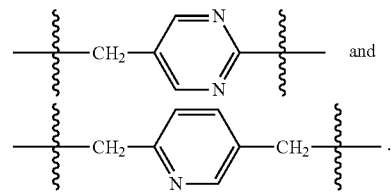

The substitutions for hydrogen atoms on W units are independently chosen from:
i) $C_1$-$C_{12}$ linear, $C_3$-$C_{12}$ branched, or $C_3$-$C_{12}$ cyclic alkyl, alkenyl, and alkynyl;
ii) substituted or unsubstituted $C_6$ or $C_{10}$ aryl;
iii) substituted or unsubstituted $C_6$ or $C_{10}$ alkylenearyl;
iv) substituted or unsubstituted $C_1$-$C_9$ heterocyclic rings;
v) substituted or unsubstituted $C_1$-$C_9$ heteroaryl rings;
vi) —$(CR^{112a}R^{112b})_b OR^{111}$;
vii) —$(CR^{112a}R^{112b})_b C(O)R^{111}$;
viii) —$(CR^{112a}R^{112b})_b C(O)OR^{111}$;
ix) —$(CR^{112a}R^{112b})_b C(O)N(R^{111})_2$;
x) —$(CR^{112a}R^{112b})_b N(R^{111})_2$;
xi) halogen;
xii) —$(CR^{112a}R^{112b})_b CN$;
xiii) —$(CR^{112a}R^{112b})_b NO_2$;
xiv) —$CH_j X_k$; wherein X is halogen, the index j is an integer from 0 to 2, j+k=3;
xv) —$(CR^{112a}R^{112b})_b SR^{111}$;
xvi) —$(CR^{112a}R^{112b})_b SO_2 R^{111}$; or
xvii) —$(CR^{112a}R^{112b})_b SO_3 R^{111}$;
wherein each $R^{111}$ is independently hydrogen, substituted or unsubstituted $C_1$-$C_6$ linear, $C_3$-$C_6$ branched, or $C_3$-$C_6$ cyclic alkyl, phenyl, benzyl, heterocyclic, or heteroaryl; or two $R^{111}$ units can be taken together to form a ring comprising 3-7 atoms; $R^{112a}$ and $R^{112b}$ are each independently hydrogen or $C_1$-$C_4$ linear or $C_3$-$C_4$ branched alkyl; the index "b" is from 0 to 4.

D units are chosen from:

i) substituted or unsubstituted $C_1$-$C_{20}$ linear alkylene, $C_3$-$C_{20}$ branched alkylene, or $C_3$-$C_{20}$ cyclic alkylene; for example, methylene ($C_1$), ethylene ($C_2$), n-propylene ($C_3$), n-butylene ($C_4$), n-pentylene ($C_5$), n-hexylene ($C_6$), n-heptylene ($C_2$), 3-methylhexylene ($C_2$), n-octylene ($C_8$), n-nonylene ($C_9$), n-decylene ($C_{10}$), and the like;

ii) substituted or unsubstituted $C_2$-$C_{20}$ linear alkenylene, $C_3$-$C_{20}$ branched alkenylene, or $C_5$-$C_{20}$ cyclic alkenylene; for example, (E)-hept-3-enylene and (Z)-oct-2-enylene;

iii) substituted or unsubstituted $C_2$-$C_{20}$ linear alkynylene or $C_3$-$C_{20}$ branched alkynylene;

iv) substituted or unsubstituted polyoxyalkylene units;

v) substituted or unsubstituted arylene; for example, 1,3-phenylene, 1,4-phenylene, 1,5-naphthylene;

vi) substituted or unsubstituted alkylenearylene; for example, a ($C_7$) unit having the formula:

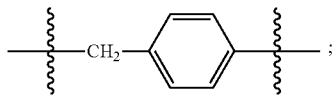

vii) substituted or unsubstituted alkylenearylalkylene; for example, a ($C_8$) unit having the formula:

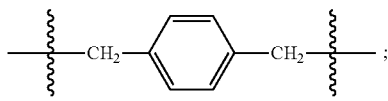

viii) substituted or unsubstituted heterocycylene; for example units having the formula:

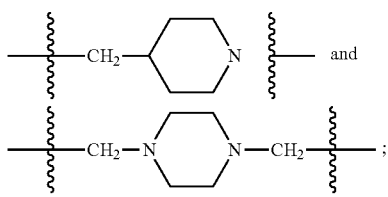

and ix) substituted or unsubstituted heteroarylene; for example units having the formula:

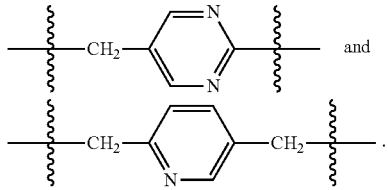

The substitutions for hydrogen atoms on D units are independently chosen from:

i) $C_1$-$C_{12}$ linear, $C_3$-$C_{12}$ branched, or $C_3$-$C_{12}$ cyclic alkyl, alkenyl, and alkynyl;

ii) substituted or unsubstituted $C_6$ or $C_{10}$ aryl;

iii) substituted or unsubstituted $C_6$ or $C_{10}$ alkylenearyl;

iv) substituted or unsubstituted $C_1$-$C_9$ heterocyclic rings;

v) substituted or unsubstituted $C_1$-$C_9$ heteroaryl rings;

vi) $-(CR^{122a}R^{122b})_cOR^{121}$;

vii) $-(CR^{122a}R^{122b})_cC(O)R^{121}$;

viii) $-(CR^{122a}R^{122})_cC(O)OR^{121}$;

ix) $-(CR^{122a}R^{122b})_cC(O)N(R^{121})_2$;

x) $-(CR^{122a}R^{122b})_cN(R^{121})_2$;

xi) halogen;

xii) $-(CR^{102a}R^{122b})_cCN$;

xiii) $-(CR^{102a}R^{122b})_cNO_2$;

xiv) $-CH_jX_k$; wherein X is halogen, the index j is an integer from 0 to 2, j+k=3;

xv) $-(CR^{122a}R^{122b})_cSR^{121}$;

xvi) $-(CR^{122a}R^{122b})_cSO_2R^{121}$; or xvii) $-(CR^{122a}R^{122b})_cSO_3R^{121}$;

wherein each $R^{121}$ is independently hydrogen, substituted or unsubstituted $C_1$-$C_6$ linear, $C_3$-$C_6$ branched, or $C_3$-$C_6$ cyclic alkyl, phenyl, benzyl, heterocyclic, or heteroaryl; or two $R^{121}$ units can be taken together to form a ring comprising 3-7 atoms; $R^{122a}$ and $R^{122b}$ are each independently hydrogen or $C_1$-$C_4$ linear or $C_3$-$C_4$ branched alkyl; the index "c" is from 0 to 4.

The diisocyanates relates to W units comprising arylene units, having the formulae:

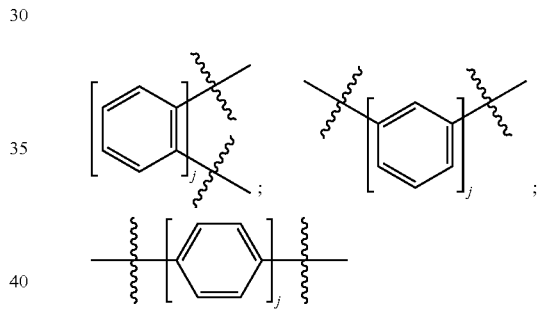

and mixtures thereof;

wherein the index j is from 1 to 10.

Non-limiting examples include:

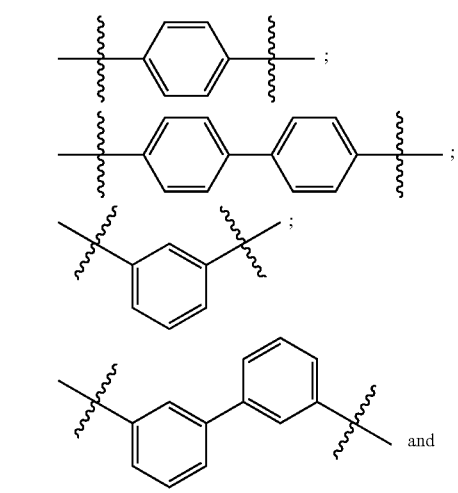

-continued

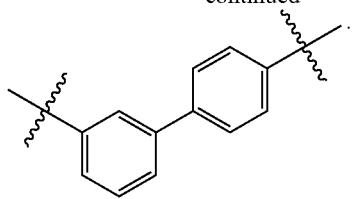

An embodiment of this aspect includes the aryl diisocyanates having the formula:

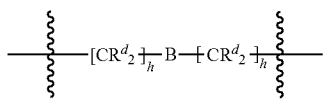

wherein B is a 1,2-substituted, 1,3-substituted, or 1,4-substituted aryl unit, for example, 1,4-substituted compounds having the formula:

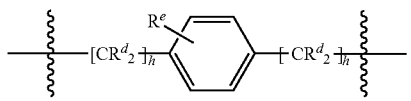

wherein each $R^d$ is independently hydrogen or methyl, $R^e$ represents from 1 to 4 substitutions for hydrogen as defined herein. Non-limiting examples of diisocyanates of this embodiment includes meta-tetramethylxylene diisocyanate, 2,4-diisocyanatotoluene, 2,5-diisocyanatotoluene, 3,5-diisocyanatotoluene, and the like.

Another aspect of diisocyanates relates to W units that comprise arylene and alkylenearylene units, for example, W units having the formula:

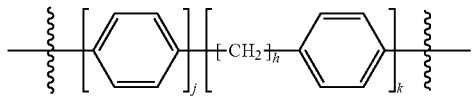

wherein the index h is from 1 to 10; and the indices j and k are each independently from 1 to 10. The following are non-limiting examples of this aspect:

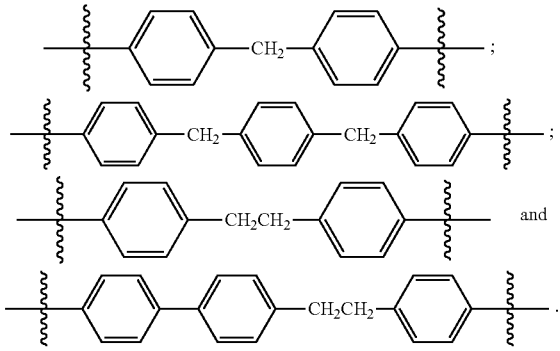

A further aspect of the disclosed diisocyanates relates to W units comprising $C_1$-$C_{20}$ linear alkylene or $C_3$-$C_{20}$ branched alkylene units, non-limiting examples having the formulae:

i) —$CH_2$—; (methylene)
ii) —$CH_2CH_2$—; (ethylene)
iii) —$CH_2CH_2CH_2$—; (propylene)
iv) —$CH_2CH_2CH_2CH_2$—; (butylylene)
v) —$CH_2CH(CH_3)$—; and (isopropylene)
vi) —$CH_2CH(CH_3)CH_2$—; (2-methylpropylene).

A yet further aspect of the disclosed diisocyanates relates to W units comprising $C_2$-$C_{20}$ linear alkenylene units, non-limiting examples having the formulae:

i) —CH=CH—; (ethenylene)
ii) —CH=CHCH$_2$—; and (prop-1-enylene)
iii) —CH$_2$CH=CHCH$_2$-(but-2-enylene).

A still further aspect of the disclosed diisocyanates relates to W units comprising $C_3$-$C_{20}$ cyclic alkenylene units, having the formulae:

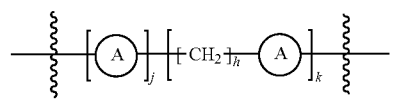

wherein A is a cycloalkyl ring having from 3 to 7 carbon atoms; the index h is from 1 to 10; and the indices j and k are each independently from 1 to 10. A first embodiment of this aspect relates to W units having the formula:

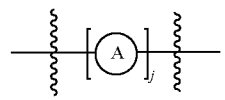

wherein A is a $C_3$-$C_6$ cycloalkylene and the index j is 1 or 2. Non-limiting examples of this embodiment have the formula:

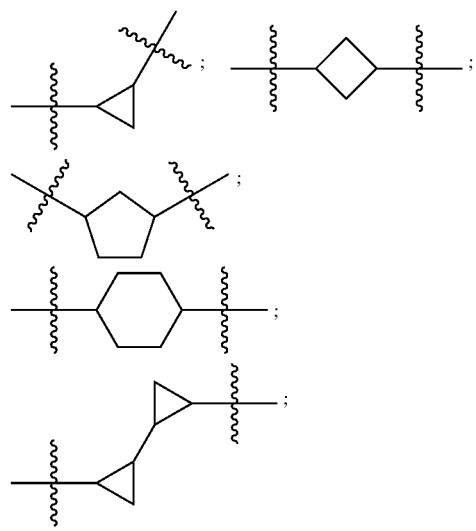

-continued

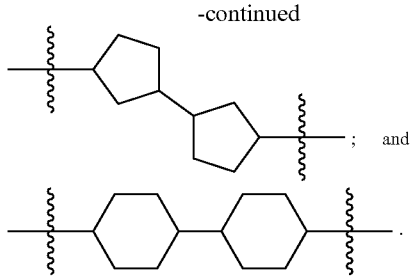 ; and

Another embodiment relates to W units having the formula:

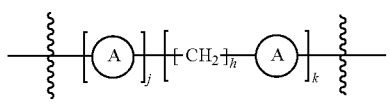

wherein A is a cyclohexyl ring. Non-limiting examples of this embodiment have the formula:

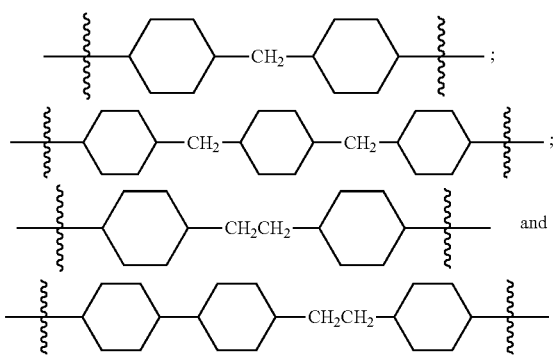

A further embodiment of this aspect relates to W units having the formula:

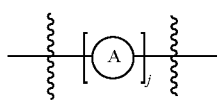

wherein A is a $C_3$-$C_6$ substituted cycloalkylene and the index j is 1 or 2. Non-limiting examples of this embodiment includes isophorone diisocyanate having the formula:

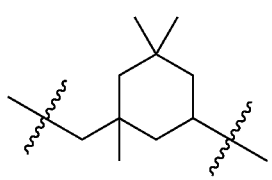

The diols relate to D units comprising $C_1$-$C_{20}$ linear alkylene units, non-limiting examples have the formulae:
i) —$CH_2$—; (methylene)
ii) —$CH_2CH_2$—; (ethylene)
iii) —$CH_2CH_2CH_2$—; (propylene)
iv) —$CH_2CH_2CH_2CH_2$—; (butylylene)
v) —$CH_2CH(CH_3)$—; and (isopropylene)
vi) —$CH_2CH(CH_3)CH_2$—; (2-methylpropylene).

Another aspect of the disclosed diols relates to D units comprising polyoxyethylene units having the formula:

—$(CH_2CH_2O)_sCH_2CH_2$— wherein the index s is from 1 to 200.

A further aspect of the disclosed diols relates to D units comprising polyoxypropylene units having the formula:

—$(CH_2CH_2CH_2O)_sCH_2CH_2CH_2$— or —$(CH_2CH(CH_3)O)_sCH_2CH(CH_3)$— wherein the index s is from 1 to 200.

A yet further aspect of the disclosed diols relates to D units comprising a mixture of polyoxyethylene and polyoxypropylene units having the formula:

—$(CH_2CH_2O)_p(CH_2CH_2CH_2)_q(CH_2CH_2O)_rCH_2CH_2$— wherein the indices p, q and r are each independently from 1 to 100.

A still further aspect of the disclosed diisocyanates relates to D units comprising $C_2$-$C_{20}$ linear alkenylene units, non-limiting examples having the formulae:
i) —CH=CH—; (ethenylene)
ii) —CH=CHCH$_2$—; and (prop-1-enylene)
iii) —CH$_2$CH=CHCH$_2$-(but-2-enylene).

A still further aspect of the disclosed diols relates to D units comprising $C_3$-$C_{20}$ cyclic alkenylene units, having the formulae:

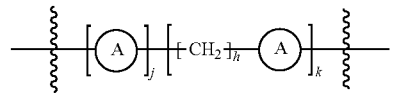

wherein A is a cycloalkyl ring having from 3 to 7 carbon atoms; the index h is from 1 to 10; and the indices j and k are each independently from 1 to 10. A first embodiment of this aspect relates to D units having the formula:

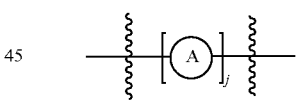

wherein A is a $C_3$-$C_6$ cycloalkylene and the index j is 1 or 2. Non-limiting examples of this embodiment have the formula:

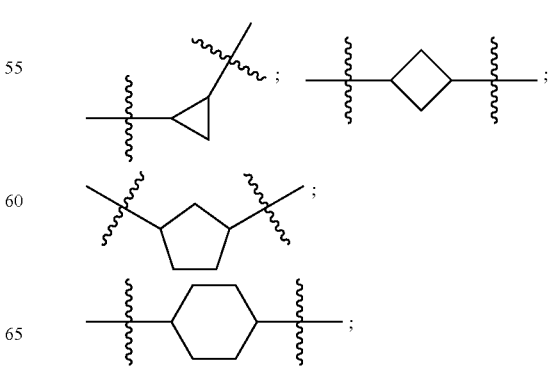

Another embodiment relates to D units having the formula:

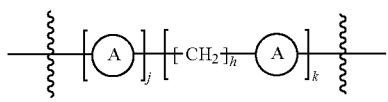

wherein A is a cyclohexyl ring. Non-limiting example have the formula:

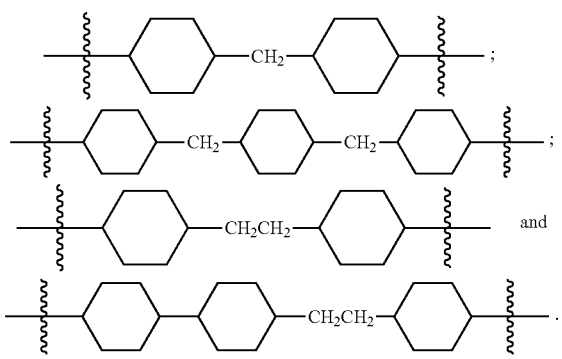

In some optional examples, a cross-linking agent may be added to the disclosed amorphous thermoplastic polymers during processing (e.g., injection molding, extruding, etc.) of the amorphous thermoplastic polymers. Alternatively, a cross-linking agent may not be added. In the optional examples where a cross-linking agent is provided any cross-linking agent sufficient for adding, assisting, or providing cross-links may be used. If present, the cross-linking agent may comprise about 0.1% to about 50% by weight of an admixture comprising the disclosed amorphous thermoplastic and the cross-linking agent.

The process of producing the disclosed thermoset shape memory polymers comprises providing an amorphous thermoplastic polymer described herein. The amorphous thermoplastic polymer may be optionally admixed with a cross-linking agent. In said optional admixture, the amorphous thermoplastic polymer may comprise about 50% to about 99.9% of the admixture by weight. The amorphous thermoplastic polymer is formed or processed into a desired shape or configuration prior to the mnemosynation process. The process of shaping or configuring the amorphous thermoplastic polymer may be any polymer processing process including, but not limited to, injection molding, blow molding, transfer molding, foaming, supercritical foaming, fiber drawing, electrospinning, extrusion, and the like.

The process of mnemosynation requires dosing the shaped or configured amorphous thermoplastic polymers or admixtures thereof by irradiating the amorphous thermoplastic polymers with a radiation dose between about 5 kGy to about 300 kGy. The radiation source may be any source including, but not limited to, electron beam, gamma (e.g., Cobalt-60), or thermal. The radiation dose may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the radiation dose may comprise about 5 kGy, about 10 kGy, about 15 kGy, about 20 kGy, about 25 kGy, about 30 kGy, about 35 kGy, about 40 kGy, about 45 kGy, about 50 kGy, about 55 kGy, about 60 kGy, about 65 kGy, about 70 kGy, about 75 kGy, about 80 kGy, about 85 kGy, about 90 kGy, about 95 kGy, about 100 kGy, about 105 kGy, about 110 kGy, about 115 kGy, about 120 kGy, about 125 kGy, about 130 kGy, about 135 kGy, about 140 kGy, about 145 kGy, about 150 kGy, about 155 kGy, about 160 kGy, about 165 kGy, about 170 kGy, about 175 kGy, about 180 kGy, about 185 kGy, about 190 kGy, about 195 kGy, about 200 kGy, about 205 kGy, about 210 kGy, about 215 kGy, about 220 kGy, about 225 kGy, about 230 kGy, about 235 kGy, about 240 kGy, about 245 kGy, about 250 kGy, about 255 kGy, about 260 kGy, about 265 kGy, about 270 kGy, about 275 kGy, about 280 kGy, about 285 kGy, about 290 kGy, about 295 kGy, or about 300 kGy. With the benefit of this disclosure, one of ordinary skill in the art will be able to apply a specific desired radiation dose to the disclosed amorphous thermoplastic polymers.

The mnemosynation process cures the amorphous thermoplastic polymer until a gel fraction is greater than 0. The mnemosynation process results in the production of a thermosetting shape memory polymer from the irradiated amorphous thermoplastic polymer. A non-uniform application of the radiation dose described above may be used if desired. For example, the radiation dose may be concentrated in one or more localized areas of the shaped amorphous thermoplastic polymer. For example, the terminal ends of a tubular-shaped amorphous thermoplastic polymer may be irradiated with a stronger dose than the middle portion of the tubular-shaped amorphous thermoplastic polymer. This may result in a greater degree of cross-linking in the terminal ends of the produced tubular-shaped thermoset shape memory polymer. Further, the properties of the resulting tubular-shaped heat-shrink elastomeric element may be altered as a result. For example, the terminal ends may shrink to a larger degree when heat is applied, resulting in ta tighter seal around the ends of the tubular-shaped heat-shrink elastomeric element. Further, the middle portion, having received a less concentrated dose of radiation, would swell to a greater degree when exposed to a swell inducing fluid such as an oleaginous fluid. This arrangement may be beneficial in some applications of the heat-shrink elastomeric element (e.g., for applications of swellable packers). Moreover, some methods of applying the radiation dose may allow for the depth of penetration of the radiation source to be adjusted. As such, the degree of cross-linking could be varied through the depth of the material producing a heat-shrink elastomeric element comprising zones of increased or decreased reactivity to external stimuli such as heat, fluids, etc. For example, the heat-shrink elastomeric element may be produced to have a greater degree of cross-linking at the exterior portions of the material. Alternatively, the heat-shrink elastomeric elements may be produced to have a greater degree of cross-linking at the interior portions of the material.

The heat applied to program the thermoset shape memory polymer into its metastable shape may be provided from any source. The thermoset shape memory polymer should be heated to or above its $T_g$ temperature. As amorphous thermoplastic polymers or monomers were used to form the thermoset shape memory polymers, the thermoset shape memory polymers are not crystalline and do not possess a melting point. As such, the amorphous thermoplastic polymers and the thermoset shape memory polymers do not melt. The $T_g$ of the thermoset shape memory polymer may be tuned as desired based on the amorphous thermoplastic polymer chosen and the molecular weight of the amorphous thermoplastic polymer. As discussed above, the $T_g$ of the thermoset shape memory polymers may range from about −40° C. to about 200° C., encompassing any number inbetween. When in the metastable shape, the heat-shrink elastomeric element may be reverted to the shape defined by its globally neutral state by heating the heat-shrink elastomeric element to or above its $T_g$ temperature. The heat may be applied from any source. In some applications where the heat-shrink elastomeric element is deployed on a downhole tool, the heat may be applied at the surface before insertion of the downhole tool into the wellbore. Alternatively, the downhole tool may be inserted and the heat may be applied downhole. For example, a heat-triggered actuator comprising the heat-shrink elastomeric element may be inserted downhole and triggered by heat from the surrounding subterranean formation.

It is also to be recognized that the disclosed treatment fluids may directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIGS. 1-5.

Provided are methods for manufacturing heat-shrink elastomeric elements in accordance with the description provided herein and as illustrated by FIGS. 1-5. An example method of manufacturing a heat-shrink elastomeric element comprises providing a thermoplastic elastomeric element having a first shape; modifying the thermoplastic elastomeric element to produce a thermoset elastomeric element having the first shape; heating the thermoset elastomeric element to a temperature of at least the glass transition temperature of the thermoset elastomeric element; adjusting the first shape of the thermoset elastomeric element to produce a second shape with at least one dimension greater than that of the first shape; and cooling the thermoset elastomeric element to a temperature below that of the glass transition temperature of the thermoset elastomeric element to produce the heat-shrink elastomeric element. The thermoplastic elastomeric element may comprise an amorphous thermoplastic polymer. The thermoset elastomeric element may comprise a thermoset polymer comprising a monomer selected from the group consisting of acrylate, acrylamide, urethane, and any combination thereof. The method may further comprise using the heat-shrink elastomeric element as a sealing element, a clamping element, or as a heat-activated actuating element. The heat-shrink elastomeric element may be a heat-shrink elastomeric swellable packer. The heat-shrink elastomeric element may be a component of a cable clamp. The heat-shrink elastomeric element may be an o-ring. The heat-shrink elastomeric element may be a component of a centralizer. The modification of the thermoplastic elastomeric element may comprise irradiating the thermoplastic elastomeric element with a radiation dose in at least one localized area of the thermoplastic elastomeric element.

Provided are methods for using heat-shrink elastomeric elements in accordance with the description provided herein and as illustrated by FIGS. 1-5. An example method of using a heat-shrink elastomeric element comprises providing the heat-shrink elastomeric element; wherein the heat-shrink elastomeric element has a first shape; wherein the heat-shrink elastomeric element comprises a thermoset polymer comprising a monomer selected from the group consisting of acrylate, acrylamide, urethane, and any combination thereof. The method further comprises fitting the heat-shrink elastomeric element over at least a portion of a downhole tool or a surface equipment; positioning the heat-shrink elastomeric element on an area of the downhole tool or the surface equipment; heating the heat-shrink elastomeric element; and using the downhole tool or the surface equipment. The fitting the heat-shrink elastomeric element over at least a portion of the downhole tool or the surface equipment may comprise fitting the heat-shrink elastomeric element over a variance in the profile of the outer diameter of the downhole tool or the surface equipment. The variance in the profile of the outer diameter may be caused by a joint, inflow control device, a collar, a shoe, or any combination thereof. The heat-shrink elastomeric element may be a heat-shrink elastomeric swellable packer. The heat-shrink elastomeric element may be a component of a cable clamp. The heat-shrink elastomeric element may be an o-ring. The heat-shrink elastomeric element may be a component of a centralizer.

Provided are systems for using heat-shrink elastomeric elements in accordance with the description provided herein and as illustrated by FIGS. 1-5. An example system comprises a tubing having an outer diameter; and a heat-shrink elastomeric packer having an inner diameter greater than the outer diameter of the tubing such that the heat-shrink elastomeric packer is capable of being positioned over the outer diameter of the tubing; wherein the heat-shrink elastomeric packer is further capable of being shrunk when positioned over the outer diameter of the tubing. The heat-shrink elastomeric packer may be a heat-shrink elastomeric swellable packer. The profile of the outer diameter of the tubing may comprise at least one variance; and wherein the heat-shrink elastomeric packer is capable of being positioned over the variance. The tubing may be disposed in a wellbore.

One or more illustrative examples disclosed herein are presented. Not all features of a physical implementation are described or shown in this application for the sake of clarity. Therefore, the disclosed systems and methods are well adapted to attain the ends and advantages mentioned, as well as those that are inherent therein. The particular examples disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown other than as described in the claims below. It is therefore evident that the particular illustrative examples disclosed above may be altered, combined, or modified, and all such variations are considered within the scope of the present disclosure. The systems and methods illustratively disclosed herein may suitably be practiced in the absence of any element that is not specifically disclosed herein and/or any optional element disclosed herein.

Although the present disclosure and its advantages have been described in detail, it should be understood that various changes, substitutions and alterations can be made herein without departing from the spirit and scope of the disclosure as defined by the following claims.

What is claimed is:

1. A method of manufacturing a heat-shrink elastomeric element comprising:
   providing a thermoplastic elastomeric element having a first shape;
   irradiating at least a portion of the thermoplastic elastomeric element with a radiation dose of between about 5 to about 300 kilogray to produce a thermoset elastomeric element having the first shape;
   heating the thermoset elastomeric element to a temperature of at least the glass transition temperature of the thermoset elastomeric element;
   adjusting the first shape of the thermoset elastomeric element to produce a second shape with at least one dimension greater than that of the first shape; and
   cooling the thermoset elastomeric element to a temperature below that of the glass transition temperature of the thermoset elastomeric element to produce the heat-shrink elastomeric element.

2. The method of claim 1, wherein the thermoplastic elastomeric element comprises an amorphous thermoplastic polymer.

3. The method of claim 1, wherein the thermoset elastomeric element comprises a thermoset polymer comprising a monomer selected from the group consisting of acrylate, acrylamide, urethane, and any combination thereof.

4. The method of claim 1, further comprising using the heat-shrink elastomeric element as a sealing element, a clamping element, or as a heat-activated actuating element.

5. The method of claim 1, wherein the heat-shrink elastomeric element is a heat-shrink elastomeric swellable packer.

6. The method of claim 1, wherein the heat-shrink elastomeric element is a component of a cable clamp.

7. The method of claim 1, wherein the heat-shrink elastomeric element is an o-ring.

8. The method of claim 1, wherein the heat-shrink elastomeric element is a component of a centralizer.

9. The method of claim 1, wherein the irradiating the thermoplastic elastomeric element comprises irradiating with a radiation dose in at least one localized area of the thermoplastic elastomeric element.

* * * * *